(12) United States Patent
Allen et al.

(10) Patent No.: US 8,439,282 B2
(45) Date of Patent: May 14, 2013

(54) LOW FLOW IRRIGATION EMITTER

(75) Inventors: Kirk A. Allen, Valencia, CA (US); Raymond P. Feith, Chino Hills, CA (US); Gerald E. Peterson, Riverside, CA (US); Samir Shah, Chino Hills, CA (US)

(73) Assignee: Rain Bird Corporation, Azusa, CA (US)

( * ) Notice: Subject to any disclaimer, the term of this patent is extended or adjusted under 35 U.S.C. 154(b) by 336 days.

(21) Appl. No.: 12/367,295

(22) Filed: Feb. 6, 2009

(65) Prior Publication Data

US 2010/0200676 A1 Aug. 12, 2010

(51) Int. Cl.
*B05B 1/30* (2006.01)
*B05B 15/00* (2006.01)
*A62C 37/20* (2006.01)
*F16K 31/12* (2006.01)
*F16K 31/36* (2006.01)

(52) U.S. Cl.
USPC ........... 239/570; 239/542; 239/562; 239/569; 137/505; 137/505.13

(58) Field of Classification Search .................. 239/443, 239/456, 457, 538, 541, 542, 562, 569, 580, 239/581.1, 570; 137/505, 505.13, 505.25, 137/505.41, 508
See application file for complete search history.

(56) References Cited

U.S. PATENT DOCUMENTS

| | | |
|---|---|---|
| 2,174,515 A | 10/1939 | Hughes |
| 2,625,429 A | 1/1953 | Coles |
| 2,639,194 A | 5/1953 | Wahlin |
| 2,794,321 A | 6/1957 | Warner et al. |
| 3,155,612 A | 11/1964 | Weber |
| 3,182,916 A | 5/1965 | Schulz |
| 3,323,550 A | 6/1967 | Lee |
| 3,420,064 A | 1/1969 | Blass et al. |
| 3,434,500 A | 3/1969 | Burrows |
| D220,763 S | 5/1971 | Best |
| 3,586,291 A | 6/1971 | Malec |
| 3,697,002 A | 10/1972 | Parkison |
| 3,729,142 A | 4/1973 | Rangel-Garza et al. |
| 3,753,527 A | 8/1973 | Galbraith et al. |
| 3,780,946 A | 12/1973 | Smith et al. |
| 3,791,587 A | 2/1974 | Drori |

(Continued)

OTHER PUBLICATIONS

Office Action mailed Jul. 30, 1999 for U.S. Appl. No. 08/607,850 (6 pages).

(Continued)

*Primary Examiner* — Ryan Reis
(74) *Attorney, Agent, or Firm* — Fitch, Even, Tabin & Flannery LLP

(57) ABSTRACT

An irrigation emitter is provided for delivering irrigation water from a water supply conduit, such as an irrigation supply tube, pipe, or other water supply apparatus, at a low volume or drip-like flow rate. The emitter operates generally through the use of a reduced size orifice and a relatively long tortuous flow channel that cause a pressure reduction between the water supply conduit and an emitter outlet. The emitter includes an inlet for tapping a portion of the water flow from the water supply conduit and, when the water pressure is above a predetermined minimum level, directing the flow to and through the flow channel for subsequent discharge to a desired location. The emitter also may regulate to accommodate for changes in supply pressure. The emitter also may include multiple emitter outlets.

46 Claims, 15 Drawing Sheets

U.S. PATENT DOCUMENTS

| | | | |
|---|---|---|---|
| 3,804,334 | A | 4/1974 | Curry |
| 3,815,636 | A | 6/1974 | Menzel |
| 3,851,896 | A | 12/1974 | Olson |
| 3,863,845 | A | 2/1975 | Bumpstead |
| 3,882,892 | A | 5/1975 | Menzel |
| 3,998,244 | A | 12/1976 | Bentley |
| 4,037,791 | A | 7/1977 | Mullett et al. |
| 4,084,749 | A | 4/1978 | Drori |
| 4,105,162 | A | 8/1978 | Drori |
| 4,177,947 | A | 12/1979 | Menzel |
| 4,209,133 | A | 6/1980 | Mehoudar |
| 4,223,838 | A | 9/1980 | Maria-Vittorio-Torrisi |
| 4,226,368 | A * | 10/1980 | Hunter .......................... 239/542 |
| 4,250,915 | A | 2/1981 | Rikuta |
| 4,274,597 | A | 6/1981 | Dobos et al. |
| 4,331,293 | A | 5/1982 | Rangel-Garza |
| 4,369,923 | A | 1/1983 | Bron |
| 4,384,680 | A | 5/1983 | Mehoudar |
| 4,508,140 | A | 4/1985 | Harrison |
| 4,513,777 | A | 4/1985 | Wright |
| 4,613,080 | A * | 9/1986 | Benson et al. ................ 239/542 |
| 4,653,695 | A | 3/1987 | Eckstein |
| 4,687,143 | A | 8/1987 | Gorney et al. |
| 4,718,608 | A | 1/1988 | Mehoudar |
| 4,753,394 | A * | 6/1988 | Goodman ..................... 239/542 |
| 4,796,660 | A | 1/1989 | Bron |
| 4,824,019 | A | 4/1989 | Lew |
| 4,856,552 | A | 8/1989 | Hiemstra |
| 5,031,837 | A | 7/1991 | Hanish |
| 5,040,770 | A | 8/1991 | Rajster et al. |
| 5,054,690 | A | 10/1991 | Olson |
| 5,111,996 | A | 5/1992 | Eckstein |
| 5,137,216 | A * | 8/1992 | Hanish ......................... 239/542 |
| 5,183,208 | A | 2/1993 | Cohen |
| 5,232,160 | A * | 8/1993 | Hendrickson et al. ........ 239/276 |
| 5,246,170 | A | 9/1993 | Woidt |
| 5,316,220 | A | 5/1994 | Dinur |
| 5,327,941 | A | 7/1994 | Bitsakis et al. |
| 5,330,107 | A | 7/1994 | Karathanos |
| 5,441,203 | A | 8/1995 | Swan et al. |
| 5,443,212 | A | 8/1995 | Dinur |
| 5,820,028 | A | 10/1998 | Dinur |
| 5,820,029 | A | 10/1998 | Marans |
| 5,875,815 | A | 3/1999 | Ungerecht et al. |
| 5,944,260 | A | 8/1999 | Wang |
| 6,015,102 | A | 1/2000 | Daigle et al. |
| 6,026,850 | A * | 2/2000 | Newton et al. ........... 137/505.41 |
| 6,062,245 | A | 5/2000 | Berglind et al. |
| 6,109,296 | A | 8/2000 | Austin |
| 6,213,408 | B1 | 4/2001 | Shekalim |
| 6,238,081 | B1 | 5/2001 | Sand |
| 6,464,152 | B1 | 10/2002 | Bolinis et al. |
| 6,499,872 | B2 | 12/2002 | Sand |
| 6,557,819 | B2 | 5/2003 | Austin |
| 6,581,902 | B2 | 6/2003 | Michau et al. |
| 6,622,946 | B2 | 9/2003 | Held et al. |
| 6,701,957 | B2 | 3/2004 | McCarty et al. |
| 6,827,298 | B2 * | 12/2004 | Sacks ........................... 239/542 |
| 6,935,370 | B2 | 8/2005 | McCarty et al. |
| 6,945,476 | B2 | 9/2005 | Giuffre |
| 7,013,918 | B2 | 3/2006 | McCarty et al. |
| D520,108 | S | 5/2006 | Patel et al. |
| 7,300,004 | B2 | 11/2007 | Sinden et al. |
| 7,363,938 | B1 | 4/2008 | Newton |
| 7,445,021 | B2 | 11/2008 | Newton |
| 7,455,071 | B2 | 11/2008 | Kim |
| 7,617,839 | B2 | 11/2009 | Newton |
| 7,648,085 | B2 | 1/2010 | Mavrakis et al. |
| 7,681,810 | B2 | 3/2010 | Keren |
| D618,305 | S | 6/2010 | Feith et al. |
| D620,550 | S | 7/2010 | Feith et al. |
| 7,802,592 | B2 | 9/2010 | McCarty |
| 7,988,076 | B2 | 8/2011 | Mamo |
| 8,033,300 | B2 | 10/2011 | McCarty |
| 8,079,385 | B2 | 12/2011 | Hatton |
| 8,096,491 | B2 | 1/2012 | Lutzki et al. |
| 8,196,608 | B2 | 6/2012 | Hatton |
| 2002/0070297 | A1 | 6/2002 | Bolinis et al. |
| 2003/0089409 | A1 | 5/2003 | Morimoto |
| 2005/0224607 | A1 | 10/2005 | Dinur et al. |
| 2006/0144965 | A1 | 7/2006 | Keren |
| 2007/0095950 | A1 | 5/2007 | Kim |
| 2009/0020634 | A1 | 1/2009 | Schweitzer et al. |
| 2009/0261183 | A1 | 10/2009 | Mavrakis et al. |
| 2009/0266919 | A1 | 10/2009 | Mavrakis et al. |
| 2010/0096479 | A1 | 4/2010 | Mamo |
| 2010/0163651 | A1 | 7/2010 | Feith et al. |
| 2010/0237170 | A1 | 9/2010 | Rosenberg et al. |
| 2010/0244315 | A1 | 9/2010 | Mamo |
| 2010/0252126 | A1 | 10/2010 | Roes |
| 2010/0282873 | A1 | 11/2010 | Mattlin et al. |
| 2011/0192916 | A1 | 8/2011 | Causby et al. |
| 2012/0012678 | A1 | 1/2012 | Gregory |
| 2012/0160926 | A1 | 6/2012 | Lutzki et al. |

OTHER PUBLICATIONS

Amendment dated Sep. 22, 1999 for U.S. Appl. No. 08/607,850 (6 pages).

Interview Summary dated Sep. 21, 1999 for U.S. Appl. No. 08/607,850 (1 page).

Request for *Ex Parte* Reexamination Transmittal Form dated Mar. 7, 2006 and Request for Reexamination of U.S. Patent No. 6,026,850 (13 pages).

Order Granting/Denying Request for *Ex Parte* Reexamination mailed Apr. 17, 2006 for U.S. Appl. No. 90/007,963 (13 pages).

* cited by examiner

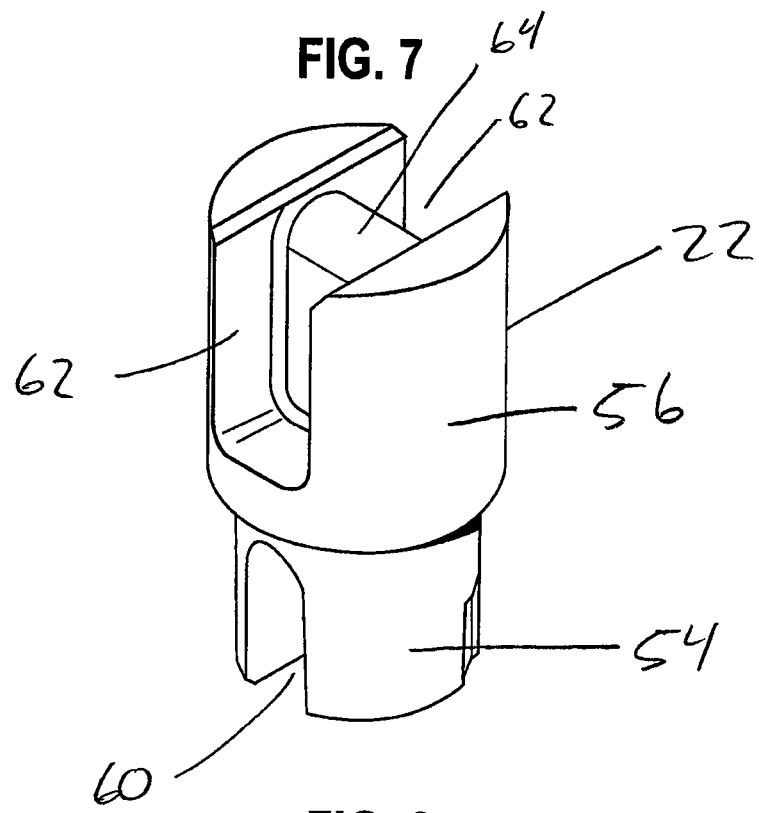
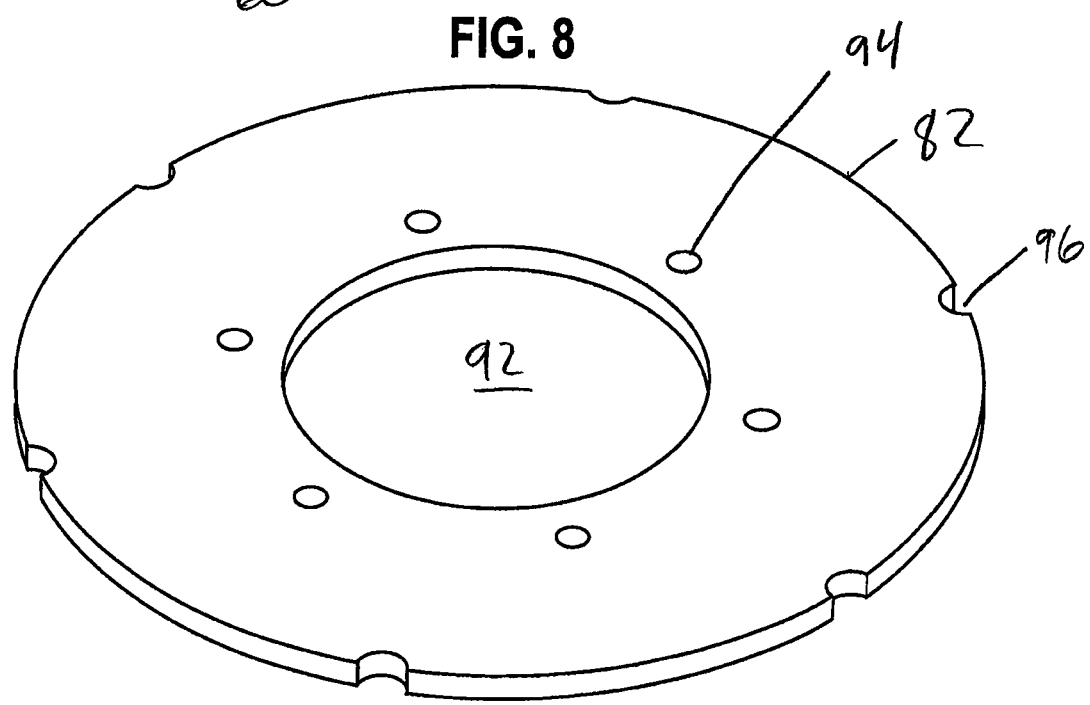

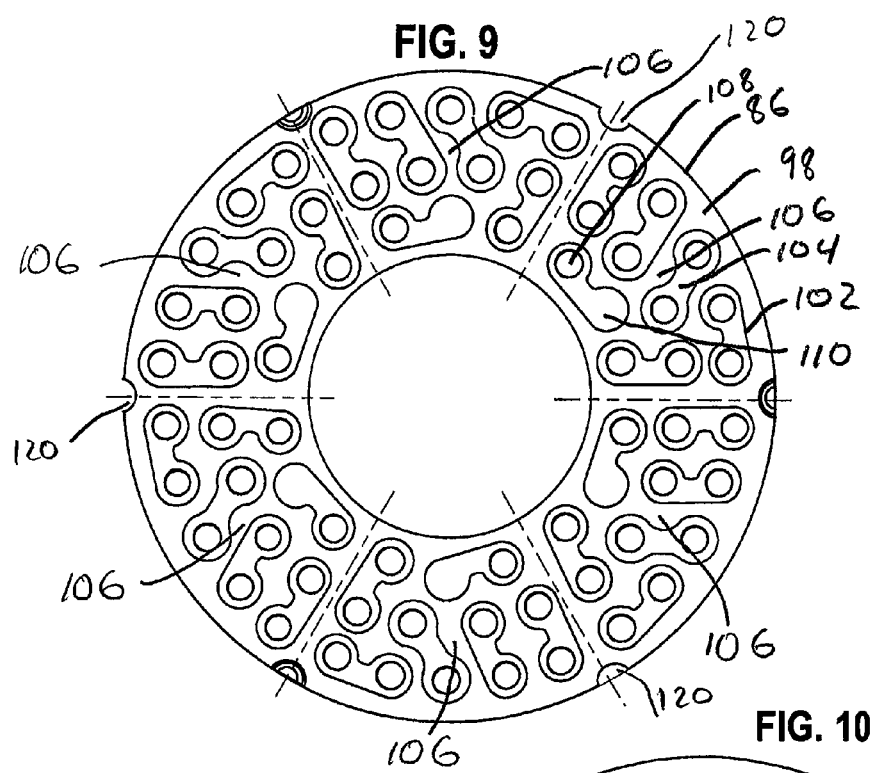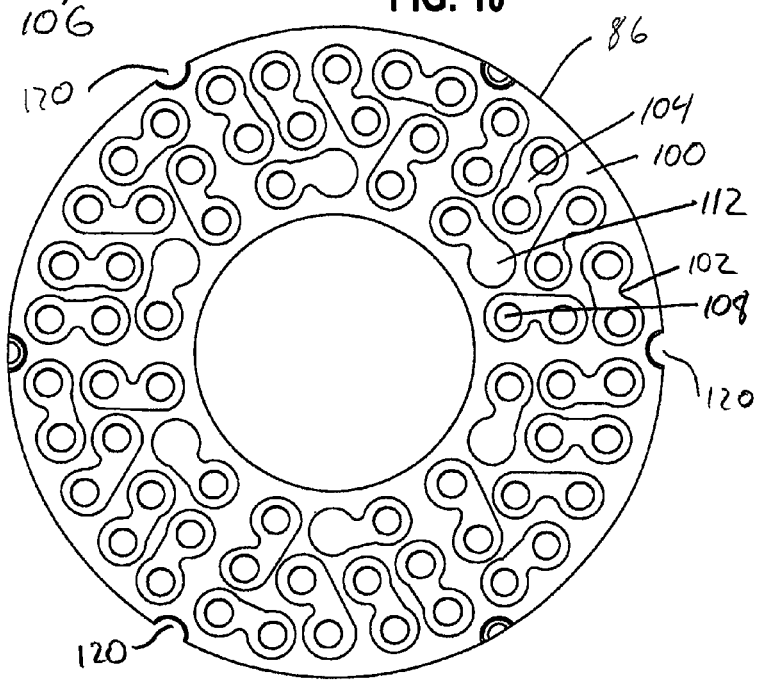

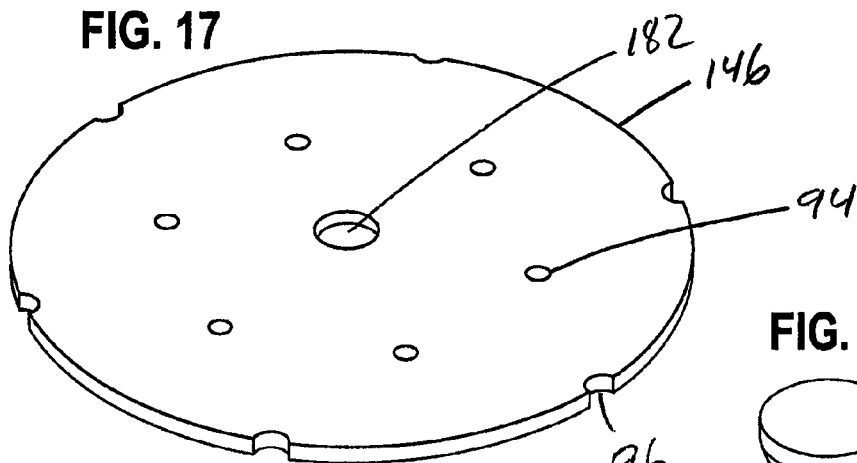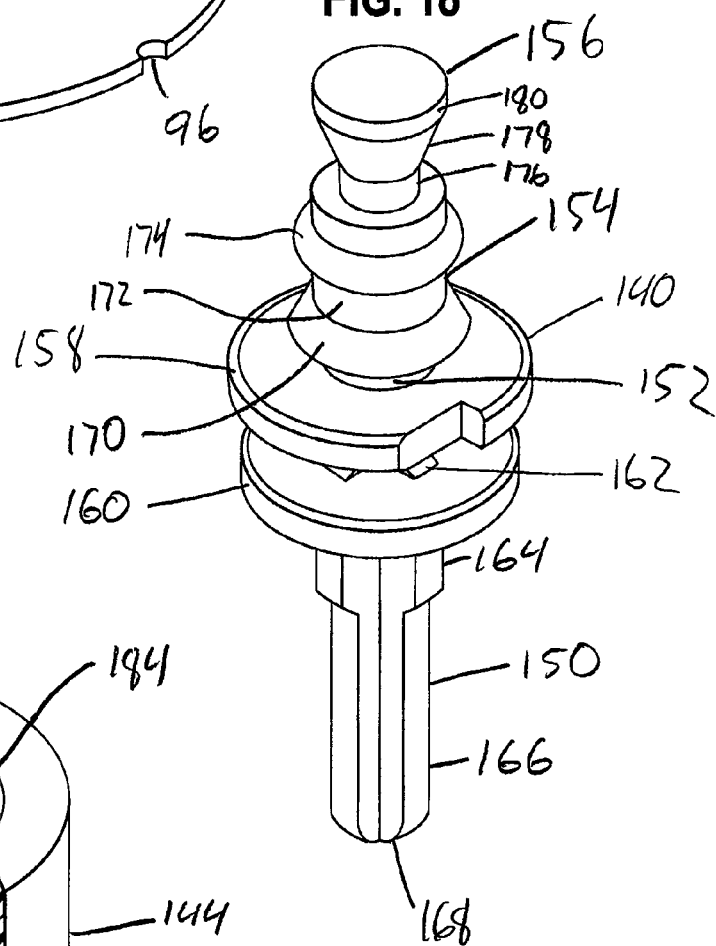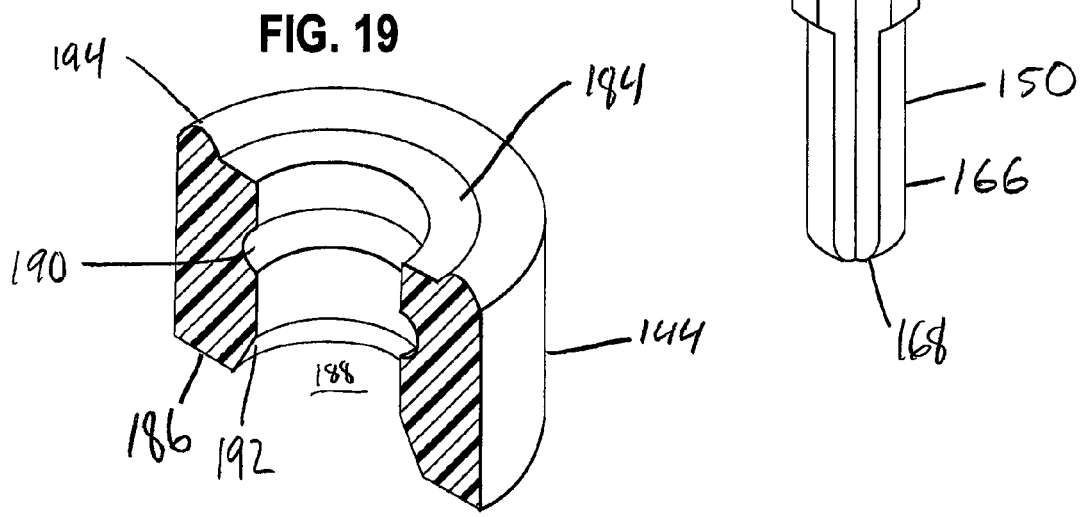

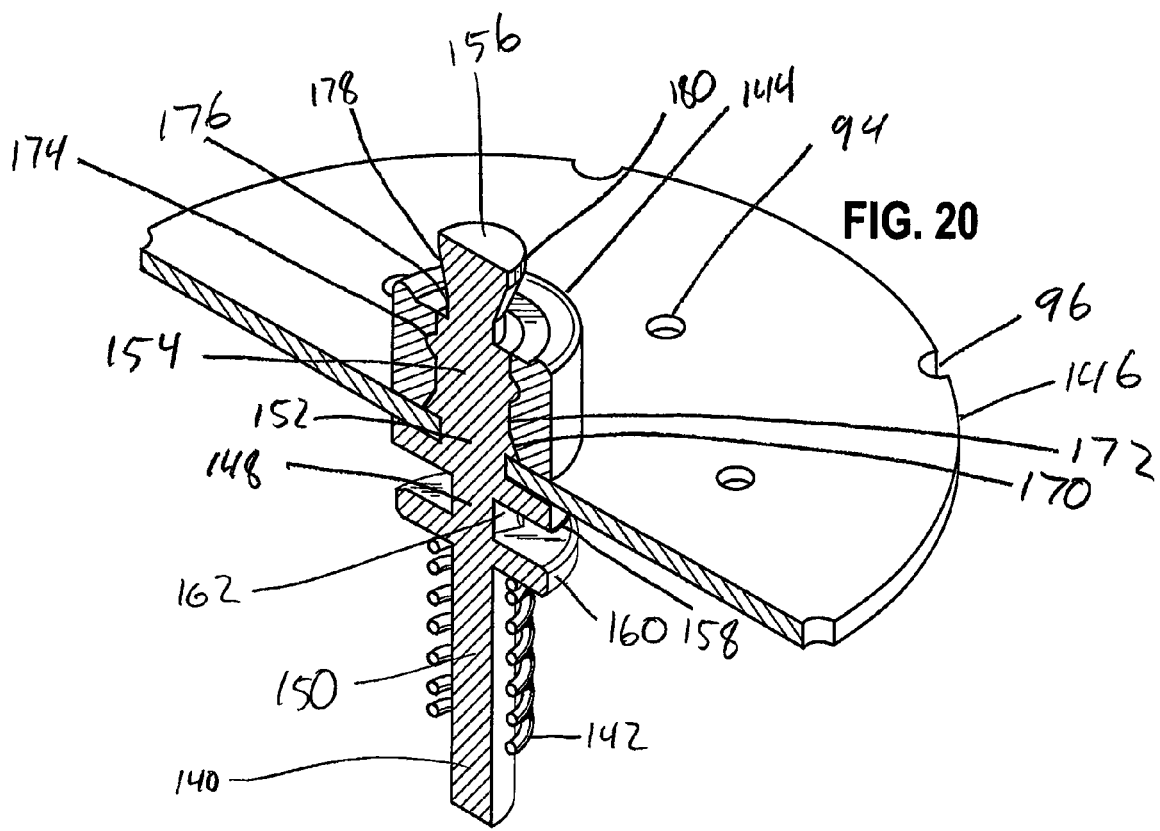

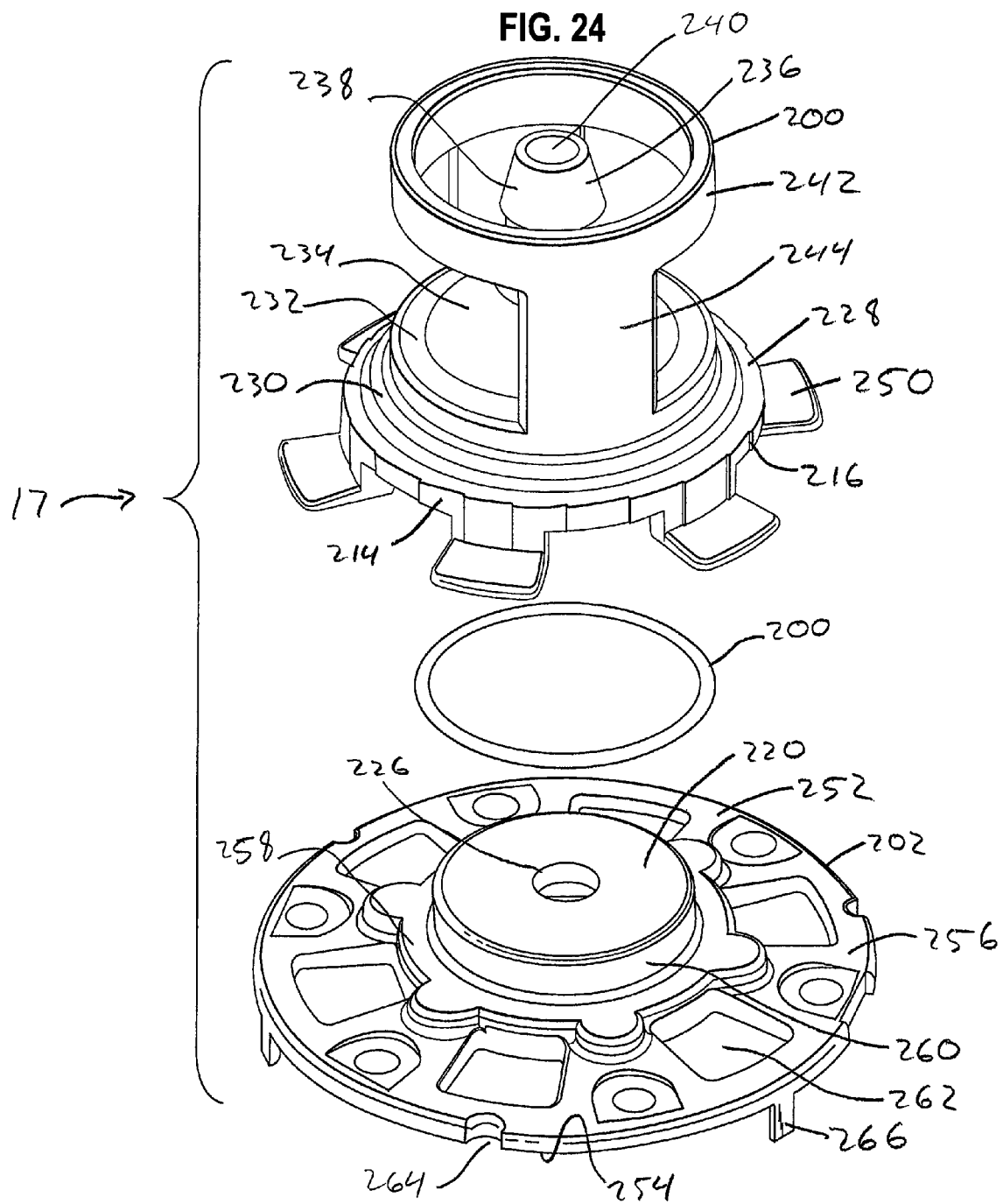

LOW FLOW IRRIGATION EMITTER

CROSS-REFERENCE To RELATED APPLICATIONS

This application is related to U.S. Design patent application Ser. No. 29/332,053, filed Feb. 6, 2009, now U.S. Design Pat. No. D615,151.

FIELD

The present invention relates to irrigation and, more particularly, to low flow irrigation emitters.

BACKGROUND

Low flow irrigation emitters (also referred to as "drip emitters") are generally known in the art for use in delivering irrigation water at relatively low volume flow rates, thereby conserving water. Such irrigation devices commonly comprise an emitter housing connected to a water supply tube through which irrigation water is supplied under pressure. The drip irrigation device taps a portion of the relatively high pressure irrigation water from the supply tube for flow through a typically long or small cross-section flow path in the device to achieve a desired pressure drop prior to discharge at a drip-like flow rate. In a conventional system, a large number of the drip irrigation devices are mounted at selected positions along the length of the supply tube to deliver the irrigation water to a large number of specific points, such as directly to a plurality of individual plants or other vegetation.

Drip emitters can be installed either below ground ("subsurface") or above ground. Drip emitters, subsurface or above ground, provide numerous advantages over spray emitters located above ground. For example, subsurface emitters limit water loss due to runoff and evaporation which provides significant savings in water consumption. Further, drip emitters prevent the distribution of water to undesired terrain, such as roadways or walkways, created from "overspray." In contrast, spray emitters often generate overspray that disturbs vehicles and/or pedestrians and wastes water. Water also may be used more economically by directing it at precise locations of the root systems of plants or other desired locations above or below ground. Another advantage of subsurface emitters is being able to water an area while still being able to use the area. For instance, such emitters may be used to irrigate park or school grounds at any desired time. Spray emitters located above ground, on the other hand, may be undesirable at parks and school grounds during daytime hours when children or other individuals are present.

A further benefit is that subsurface emitters are not easily vandalized, given their underground installation. Thus, subsurface emitters result in reduced costs associated with replacing vandalized equipment and with monitoring for the occurrence of such vandalism. This is important particularly for publicly accessible areas, such as parks, school grounds, and landscaping around commercial buildings and parking lots. The above-identified benefits and advantages are only illustrative of the many benefits and advantages of subsurface and above ground drip emitters.

One known challenge with drip emitters is the ability to provide one that compensates for water pressure fluctuations in a reliable manner to provide a consistent low flow or drip rate. Such fluctuations result in the inefficient and wasteful use of water. Thus, there is a need to provide for a relatively constant drip flow output from drip emitters, regardless of fluctuations in the water pressure in the supply tube, with an emitter design that is economic to manufacture.

Another known challenge with drip emitters is to provide a design that does not clog. Clogging of an emitter may result from the introduction of grit, debris, or other particulate matter, both from debris entering the emitter through the supply tube and debris entering the emitter from the terrain being irrigated, i.e., "back siphoning." Such obstruction of an emitter may result in severe, and in some cases complete, flow restriction, potentially preventing the emitter from operating entirely. Many irrigation systems depend on the operation of each specifically situated emitter for sufficient water coverage to maintain healthy grass, crop, or other plant growth.

In the event that an emitter does become obstructed, there is a need for the emitter to be capable of removing the obstruction. Without such ability, the emitter would have to be replaced or cleaned manually. Even more concerning is that the obstruction would not become apparent until the target of the emitter's water flow visibly suffered from lack of irrigation. This could result in the complete loss of the vegetation intended for irrigation. Accordingly, there is a need to prevent drip emitters from becoming obstructed.

Another known challenge with drip emitters is the ability to provide irrigation to multiple regions located a distance away from the irrigation supply line. The drip emitter flow is generally restricted to the region located immediately about the emitter or to a single area reached by an irrigation tube attached to the drip emitter outlet. Accordingly, there is a need for single drip emitters to be capable of irrigating multiple areas at distances away from the emitter.

BRIEF DESCRIPTION OF THE DRAWINGS

FIG. 7 is a perspective view of a valve of the drip emitters of FIGS. 1-4;

FIG. 8 is a perspective view of a gasket disc of the drip emitters of FIGS. 1-4;

FIG. 9 is a top view of a flow disc of the drip emitters of FIGS. 1-4;

FIG. 10 is a bottom view of the flow disc of FIG. 9;

FIG. 17 is a perspective view of a diaphragm disc of the drip emitters of FIGS. 1-4;

FIG. 18 is a perspective view of a poppet of the drip emitters of FIGS. 1-4;

FIG. 19 is a perspective view of a cross-section of a check valve of the drip emitters of FIGS. 1-4;

FIG. 20 is a perspective view of a flow regulator assembly of the drip emitters of FIGS. 1-4

FIG. 21 is a perspective view of a locking cover of the drip emitters of FIGS. 1-4;

FIG. 24 is an exploded view of a barb inlet, an 0-ring, and a barb seat of the drip emitter of FIG. 3.

DETAILED DESCRIPTION OF THE PREFERRED EMBODIMENTS

Figure 1:
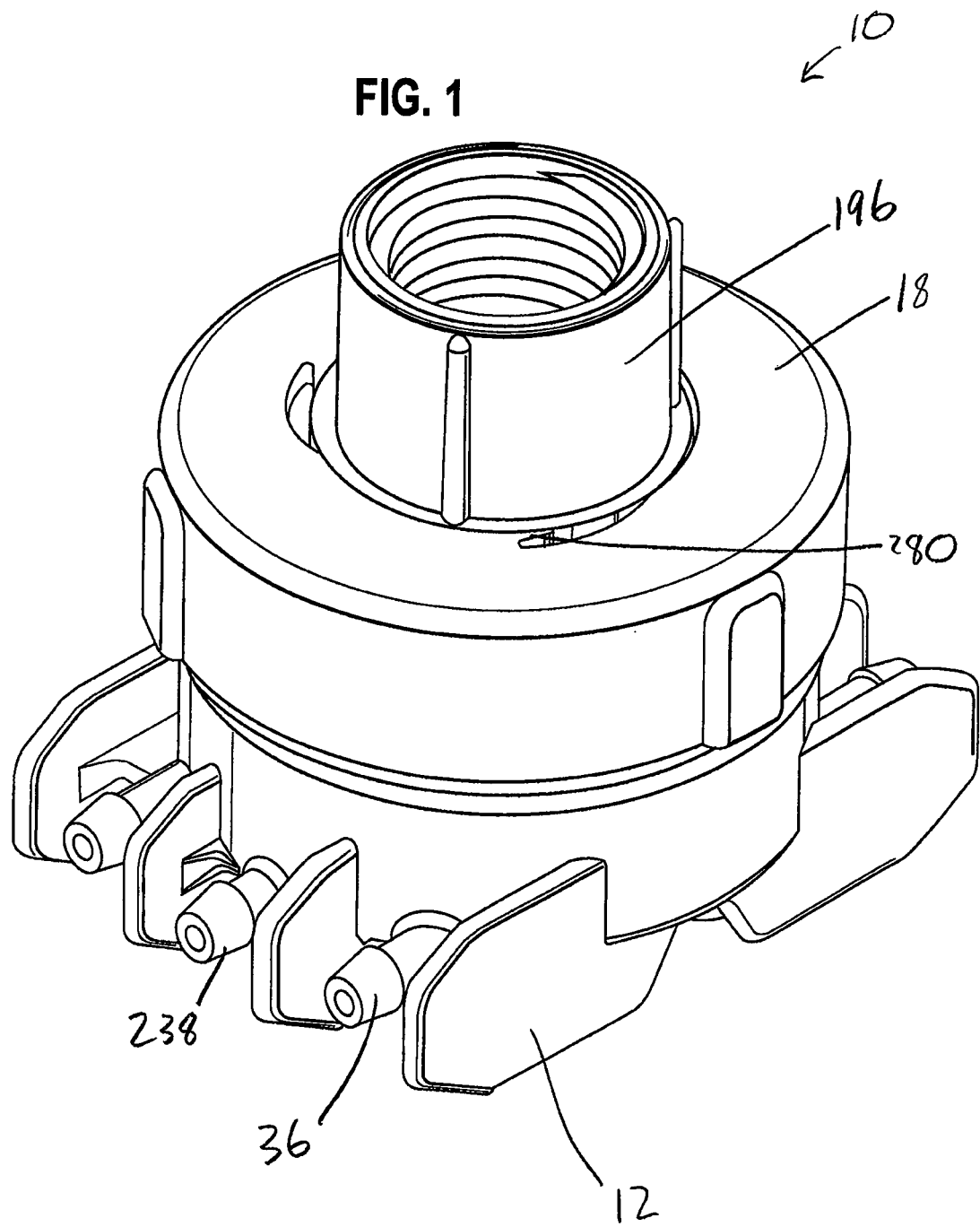
FIG. 1 is a perspective view of a drip emitter embodying features of the present invention.

With reference to FIGS. 1-4, a drip irrigation emitter 10 is provided for delivering irrigation water from a water supply conduit (not shown), such as an irrigation supply tube, pipe, or other water apparatus, at a low volume, drip-like flow rate. The emitter 10 comprises an outlet assembly 12, a flow disc assembly 14, a flow regulator assembly 16, an inlet component or assembly 17, and a locking cover 18. The inlet component or assembly 17, the regulator assembly 16, the flow disc assembly 14, and the outlet assembly 12 combine to form an elongated flow path 19. Generally, water enters the emitter 10 through the inlet component or assembly 17 and, when the water pressure is above a pre-determined level, the water will flow through the flow path 19 and out of the emitter 10 through the outlet assembly 12 at a reduced drip-like flow rate.

Figure 6:
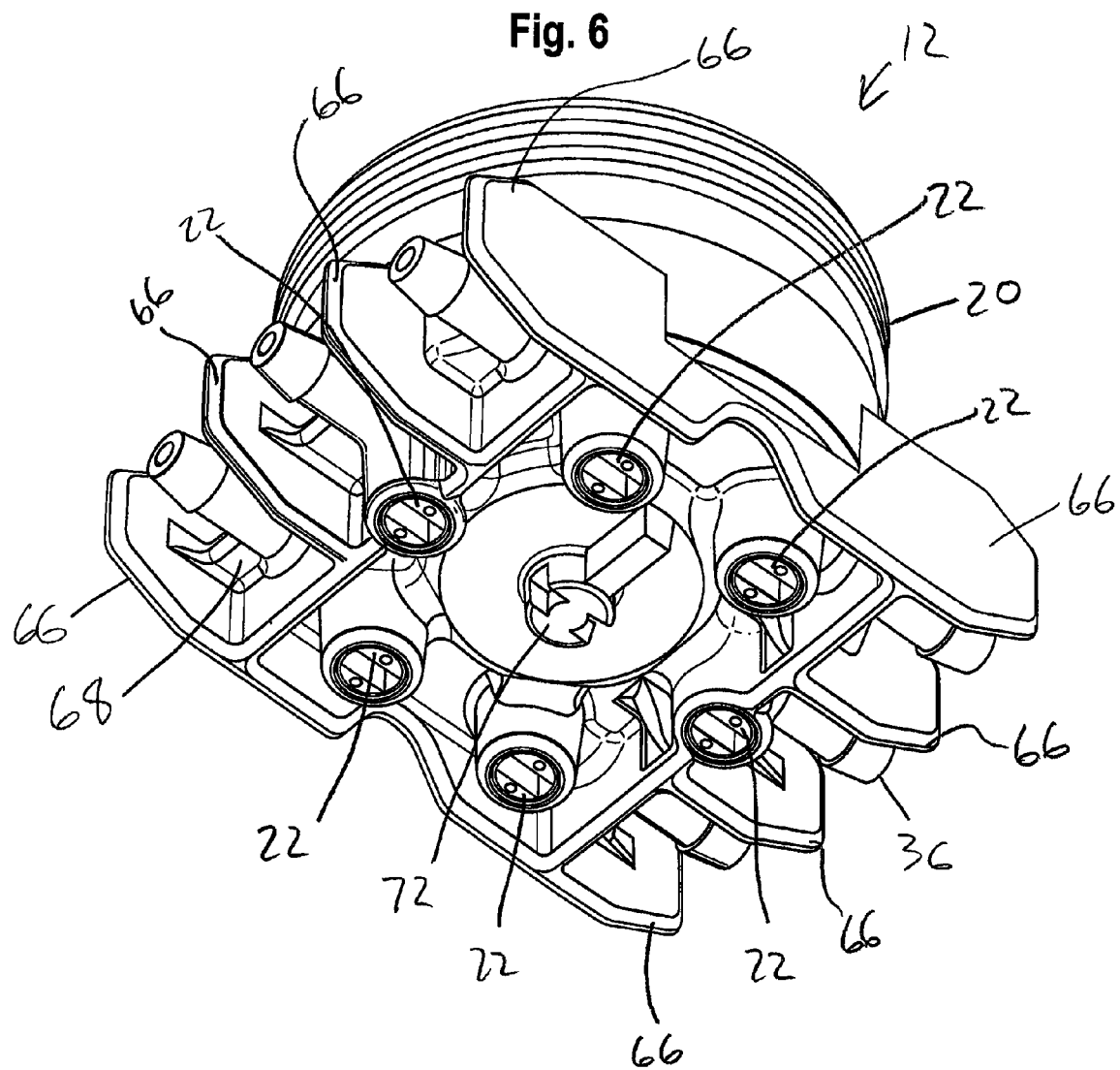
FIG. 6 is a perspective view of the outlet component of FIG. 5.
Figure 11:
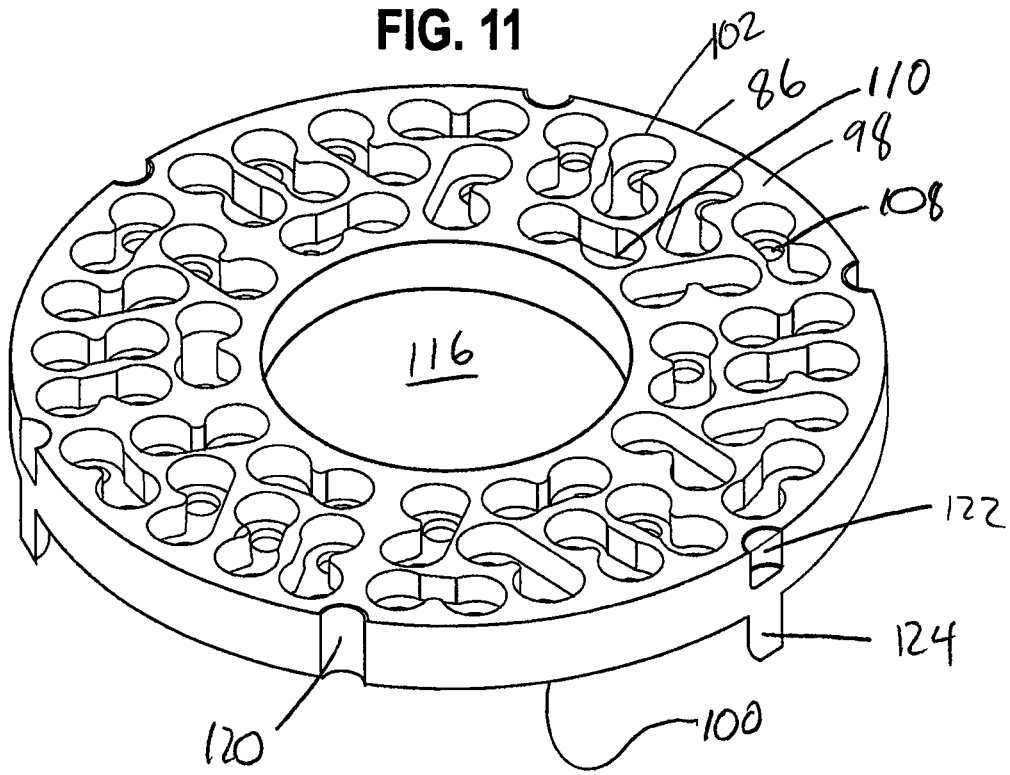
FIG. 11 is a perspective view of the flow disc of FIG. 9.

As shown in FIGS. 3-6, the outlet assembly 12 comprises a housing 20 and a plurality of outlet valves 22 (FIG. 6). The housing 20 includes a base manifold 24 having a generally planar base surface 26 and a generally cylindrical outer wall 28 which defines an internal chamber 30. The outer wall 28 includes an external threaded region 32 that engages the locking cover 18 when the emitter 10 is assembled. The housing 20 also includes a plurality of longitudinally running alignment ribs 34 that protrude from the outer wall 28 within the chamber 30. The housing also includes a plurality of alignment notches 35 that are defined by the manifold 24. The alignment ribs 34 and the alignment notches 35 ensure that the emitter 10 is properly assembled.

The housing 20 preferably includes six outlets 36 which extend outward from the housing 20 generally along a plane that is perpendicular to the central axis of the housing 20. Three outlets 36 extend parallel to each other on one side of the emitter 10, and the other three outlets 36 extend in the opposite direction on an opposite side of the emitter 10. The outlets 36 include an open barbed end 38 and an outlet channel 40 defined by the outlet 36 that creates fluid communication with the internal chamber 30. In a preferred form, the housing 20 is made from a generally hard plastic material, such as Acetal, though other suitable materials could be used.

The manifold 24 defines, preferably, six generally cylindrical outlet baths 42 that are generally equally spaced about the central axis of the housing 20 at a constant radial distance from the central axis. In a preferred form, the axis of each outlet bath 42 is parallel to the central axis of the housing 20. The manifold 24 also defines six valve seats 44. The valve seats 44 are disposed equally about the axis of the housing 20 at substantially the same circumferential angle as the outlet baths 42, however, the axis of each valve seat 44 is located outward of the axis of each outlet bath 42. The combination of the outlet bath 42 and the valve seat 44 combine to define an outlet bath surface 46. The valve seats 44 have an internal portion 48 and an external portion 50 where the diameter of the internal portion 48 is greater than the diameter of the external portion 50. The internal portion 48 is open to the chamber 30 and the external portion is open to outside of the housing 20. The valve seats 44 also include a tapered portion 52 between the internal portion 48 and the external portion 50. Each internal portion 48 is in fluid communication with the outlet channel 40 before the valves 22 are installed.

As shown in FIG. 7, each valve 22 has a drive portion 54 and a valving portion 56. The valves 22 are configured to be received within the valve seats 44 when the emitter 10 is assembled. The drive portion 54 has a smaller overall diameter than the valving portion 56 and a tapered portion 58 connects the two. The valving portion 56 has an approximately one degree taper. The sizing of the valve 22 is such that the valving portion 56 is slightly larger than the internal portion 48 of the valve seat 44 to create a tight seal in that area when the valve 22 is received within the valve seat 44. The drive portion 54 is slightly smaller than the external portion 50 of the valve seat 44 to facilitate ease of turning. The angles of the tapered portions 52 and 58 are approximately the same to facilitate installation.

Figure 2:
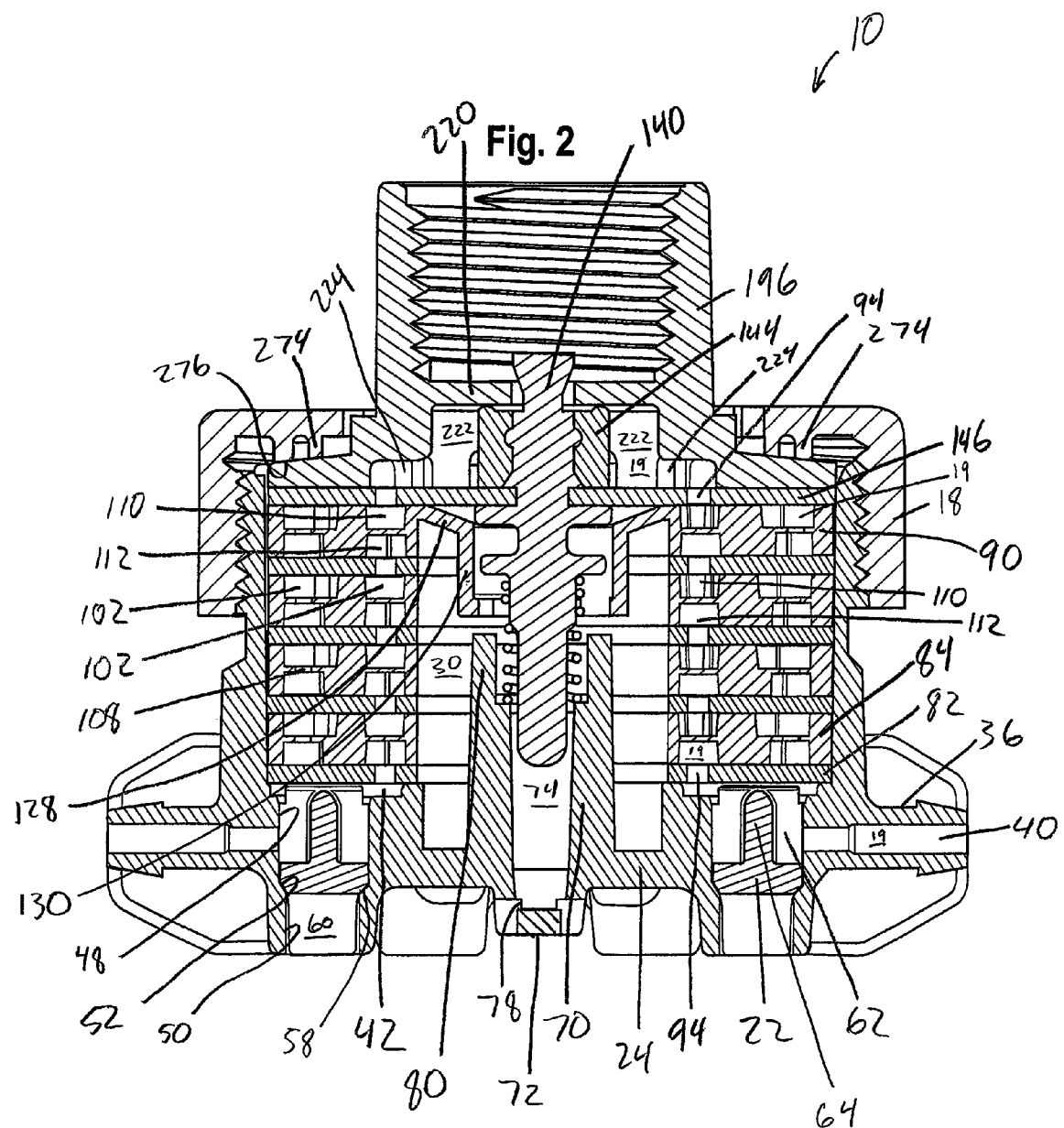
FIG. 2 is a cross-section view of the drip emitter of FIG. 1 and showing one operational condition.

When assembled, each valve seat 44 receives one of the valves 22. The drive portion 54 defines a slot 60 configured to receive a tool in order to rotate the valve 22 between "on" and "off" positions. The valving portion 56 defines a pair of recesses 62 having substantially the same shape separated by a wall 64. When the valve 22 is in the "on" position, as shown in FIG. 2, one of the recesses 62 is open to the outlet channel 40 so that water located within the outlet bath 42 can pass through the recess 62 and into the outlet channel 40. When the valve 22 is rotated such that an outer arcuate surface of the valving portion 56 closes off the outlet channel 40, water will accumulate in the outlet bath 42 and the recesses 62 but be restricted from flowing beyond that point into the outlet channel 40. While the above description describes a preferred embodiment of, among other features, six outlets 24, six valves 26, and six valve seats 28, other corresponding quantities may also be used.

The housing 20 also preferably includes a plurality of fins 66 extending from the housing 20 in the same direction as the outlets 36. These fins 66 are disposed on each side of each outlet 36 to protect the outlets 36 from damage, such as being stepped on, or in the event the emitter 10 is dropped. It also guards against unintentional disconnection of a water tube attached to the outlet 36. The fins 66 also include support ribs 68 that extend between the fins 66 and the housing 20.

Figure 3:
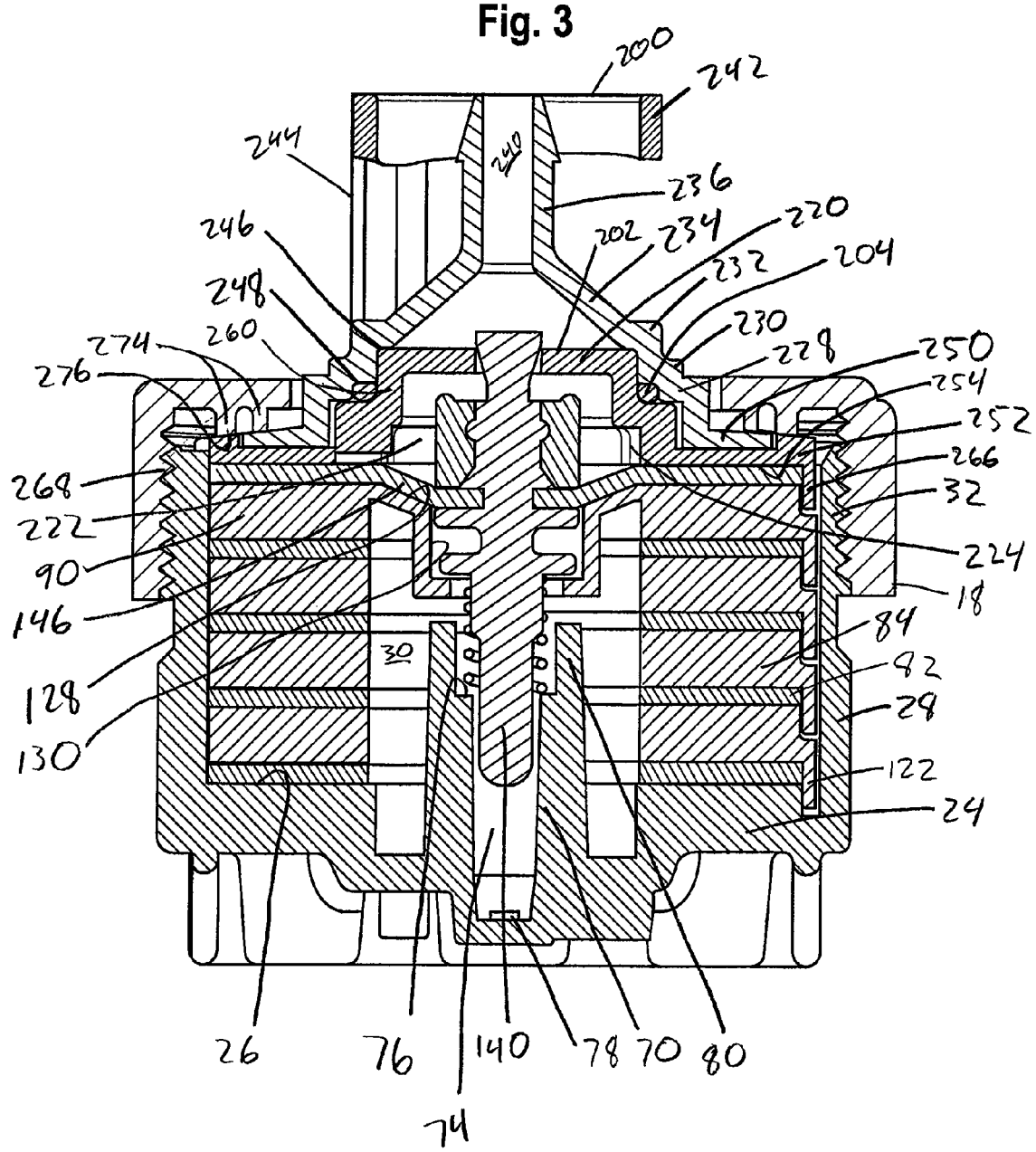
FIG. 3 is a cross-section view of an alternative embodiment of a drip emitter embodying features of the present invention and showing another operational condition.

As shown in FIGS. 2-5, within the chamber 30, the housing 20 includes a support tower 70 extending along the central axis of the housing 20 from the manifold 24. The tower 70 is integral with the manifold 24. The housing 20 also includes an external protrusion 72 at the base of the support tower 70, as shown in FIGS. 2, 3, and 6, extending along the axis of the housing 20 outside of the chamber 30. The tower 70 defines a tower recess 74 that extends into the external protrusion 72. The tower 70 also includes an annular step 76 within the chamber 30. The tower recess 74 has a generally tapered shape having preferably a taper angle of approximately two degrees where the recess 74 is wider at the annular step 76 and becomes narrower as it approaches the manifold 24. The external protrusion 72 defines a pair of vents 78 that communicate with the outside of the housing 20. The tower 70 preferably includes four longitudinal support walls 80 that extend radially from the tower 70 and axially from the annular step 76.

Figure 4:
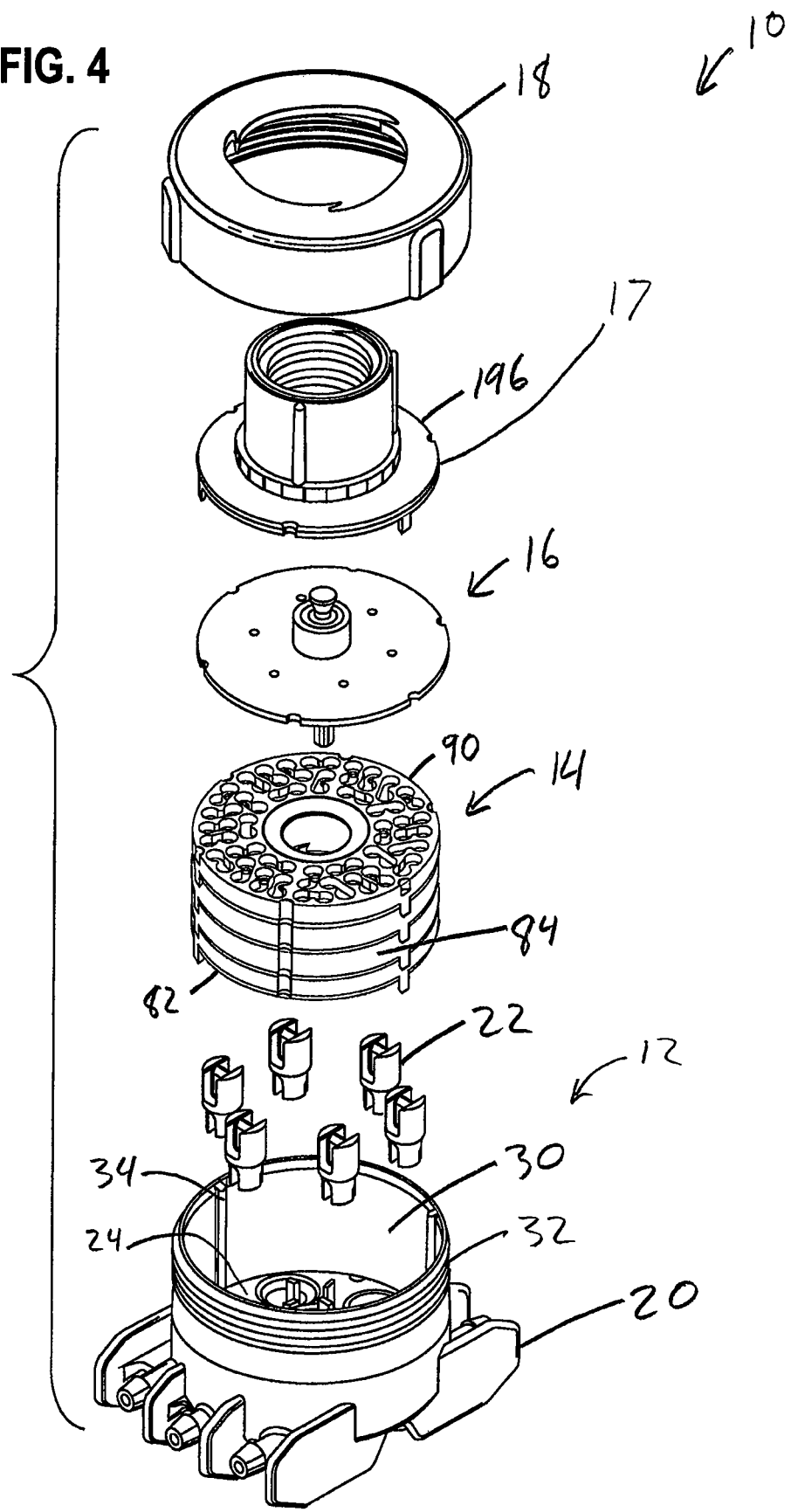
FIG. 4 is an exploded view of the drip emitter of FIG. 1.
Figure 5:
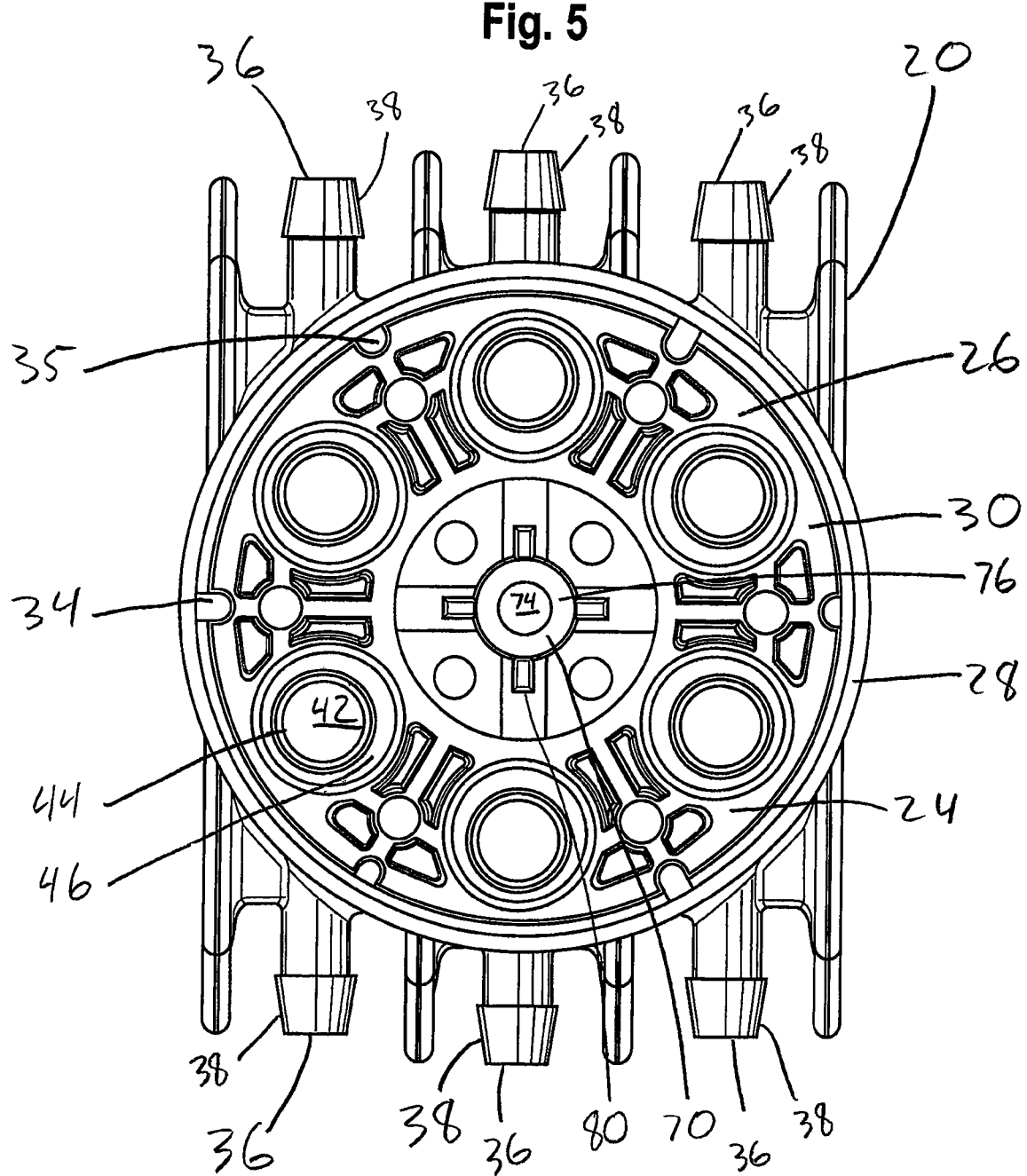
FIG. 5. is a top view of an outlet component of the drip emitters of FIGS. 1-4.

The flow disc assembly 14, as shown in FIG. 4, is comprised of a stack of coaxially aligned gasket discs 82 and flow discs 84. The flow disc assembly 14 is received within the outlet assembly 12 when assembled. There are various embodiments that use various types of flow discs 84 to alter the amount of water that passes through the emitter 10 in a predetermined time period. The types of flow discs 84, shown in FIGS. 9-16, include: a standard flow disc 86, a bypass flow disc 88, and a poppet well flow disc 90. The flow disc assembly 14 is generally arranged in the following order (beginning with the disc closest to the base surface 26): one of the gasket discs 82, a variable flow disc V1, one of the gasket discs 82, a variable flow disc V2, one of the gasket discs 82, a variable flow disc V3, one of the gasket discs 82, and the poppet well flow disc 90. In one embodiment, three of the bypass flow discs 88 are used as the variable flow discs V1, V2, and V3. In an alternate embodiment, the bypass flow disc 88 is used as the variable flow disc V1, and the standard flow discs 86 are used as the variable flow discs V2 and V3. Other combinations of the standard flow discs 86 and the bypass flow discs 88 could also be used. Additionally, a different number of the flow discs 84 and the gasket discs 82 could be used.

As shown in FIG. 8, in a preferred embodiment, the gasket disc 82 has a generally circular shape and includes a center hole 92. The gasket disc 82 also preferably includes six flow holes 94 spaced equally apart about the axis at substantially the same radial distance from the central axis. The gasket disc 82 also defines six equally spaced alignment notches 96 located at the periphery of the gasket disc 82. In a preferred form, the flow holes 94 have a diameter of approximately 0.068+0.015/−0.000 inches, however other diameters also could be used. The gasket disc also could include different quantities of flow holes 94 and alignment notches 96. The gasket disc is preferably made from a flexible material such as peroxide cured EPDM, 50 Shore A Durometer. However, other flexible materials also could be used.

Figure 12:
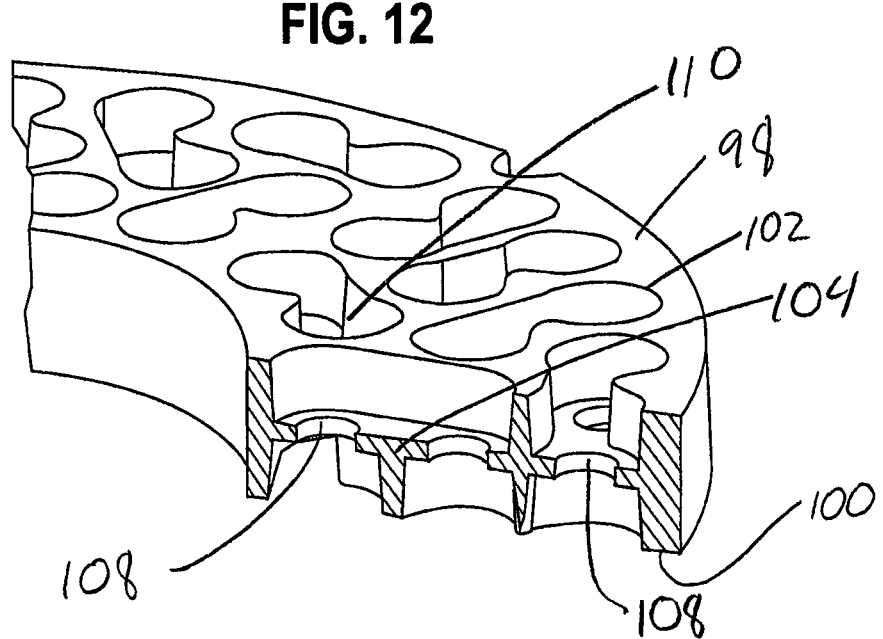
FIG. 12 is a perspective view of a partial cutout of the flow disc of FIG. 9.

As shown in FIGS. 9-16, each type of flow disc 84 includes an inlet side 98 and an outlet side 100. The flow discs 84 define a plurality of eye-goggle shaped recesses 102 laid out in a spaced apart pattern. The eye-goggle shaped recesses 102 are disposed on both the inlet side 98 and the outlet side 100 of the flow disc 84. The depth of the recesses 102 is less than half of the thickness of the flow disc 84, such that an intermediate layer 104 remains in the middle of the flow disc 84 (FIG. 12).

The recesses 102 are arranged such that they are grouped into six substantially similar regions 106, as shown in FIG. 9, corresponding to the preferred number of outlets 36. While the preferred form uses six regions 106, other quantities of regions also could be used to correspond to other quantities of outlets 36. Each region 106 preferably includes six of the eye-goggle shaped recesses 102 on both the inlet side 98 and the outlet side 100 of the flow disc 84. Each region 106 preferably includes 11 transfer holes 108. Each transfer hole 108 fluidly connects an eye-goggle shaped recess 102 on one side to an eye-goggle shaped recess 102 on the opposite side of the flow disc 84. The recesses 102 are arranged such that no two recesses 102 share the same two transfer holes 108, thus fluidly connecting each recess 102 in the region 106 in series. Each region 106 includes an entry point 110 and an exit point 112 having substantially the same radial location. When assembled, the entry points 100, the exit points 112, and the flow holes 94 of the gasket disc 82 are generally coaxially aligned.

In each region 106 of the standard flow disc 86 (FIGS. 9-12), the entry point 110 is located at the inlet side 98 of the standard flow disc 86 and the exit point 112 is located on the outlet side 100 such that they are separated by the intermediate layer 104. Water entering the standard flow disc 84 at the entry point 110 will be stopped by the layer 104 and forced toward and through the transfer hole 108 of the recess 102 located at the entry point 110.

In each region 106 of the bypass flow disc 88 (FIG. 16), the intermediate layer 104 includes a bypass hole 114 at the location of the entry point 110 and the exit point 112. Water entering the bypass flow disc 88 will pass directly through the entry point 110, through the bypass hole 114, and through the exit point 112 without being forced toward and through one of the transfer holes 108, thus creating a shorter flow path 19 than if the standard flow disc 86 is used. The eye-goggle shaped recess 102 that includes the bypass hole 114 does not include one of the transfer holes 108. In a preferred form, the bypass hole has a diameter of approximately 0.123+/−0.005 inches, however, other diameters could be used. The bypass The standard flow disc 86 and the bypass flow disc 88 include a generally circular flow disc center hole 116 having a diameter substantially the same as the center hole 92 of the gasket disc 82. When the gasket discs 82 are assembled with the flow discs 84, the gasket flow holes 94 align with the entry points 110 and the exit points 112 of the flow discs 84. The eye-goggle shaped recesses 102 in the standard flow disc 86 combine with the gasket discs 82 to define a tortuous portion 118 of the flow path 19.

In the case of one of the standard flow discs 86 (FIGS. 9-11), water flows through the gasket flow hole 94 adjacent the inlet side 98 and into the standard flow disc 86 at the entry point 110. The water is then forced toward and through the first transfer hole 108 and into the fluidly connected eye-goggle shaped recess 102 on the outlet side 100. The water then continues to flow to and through the subsequent transfer hole 108 and into the subsequent fluidly connected eye-goggle shaped recess 102 on the inlet side 98. The water continues to flow through the transfer holes 108 and recesses 102 on alternating sides of the standard flow disc 86 until it reaches the exit point 112. The water will then flow through the gasket flow hole 94 adjacent the exit point 112 and into the subsequent flow disc 84. In a preferred form, the transfer holes 108 have a diameter of approximately 0.055+/−0.003 inches, however other diameters also could be used.

Each type of flow disc 84 also preferably defines three flow disc alignment notches 120 at the periphery of the flow disc 84. Each flow disc 84 also defines an installation notch 122 and corresponding installation peg 124. The installation notch 122 and the peg 124 are located at the periphery of the flow disc 84 between the flow disc alignment notches 120. The installation notches 122 are disposed at the inlet side 98, and the pegs 124 extend longitudinally from the outlet side 100. When assembled, the installation notches 122 of one of the flow discs 84 receive the pegs 124 of the flow disc 84 nearest the inlet side 98. The pegs 124 also pass through the alignment notches 96 of the gasket discs 82 when assembled. In the case of the flow disc 84 nearest the manifold 24, the pegs 124 are received by the alignment notches 35. The flow discs 84 are preferably made from a hard plastic material, such as polypropylene; however, other materials could be used.

Figure 13:
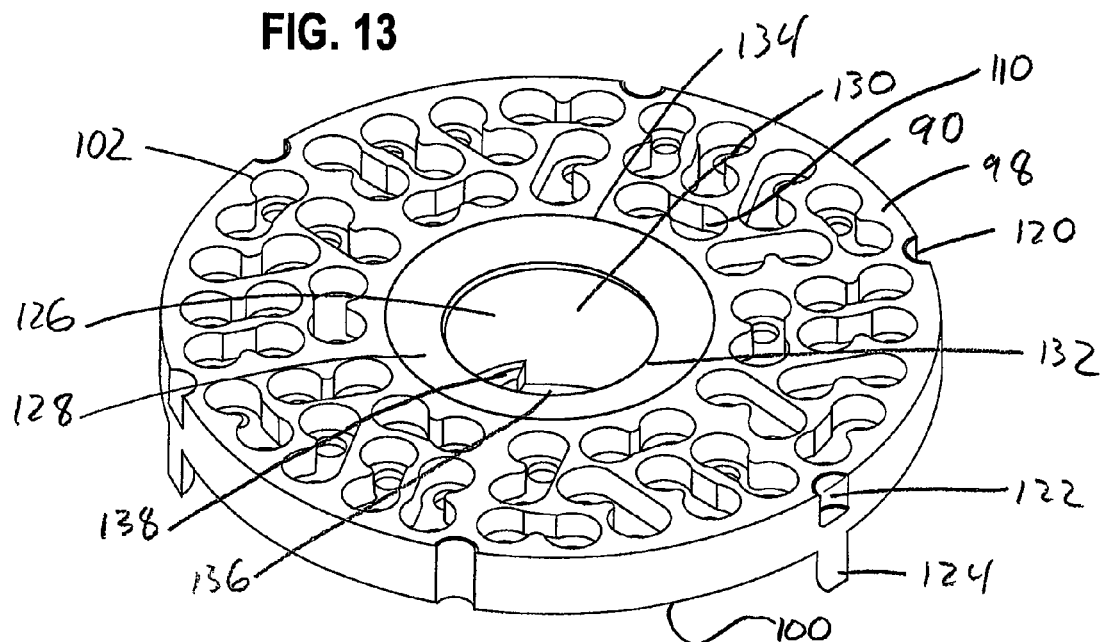
FIG. 13 is a perspective view of another flow disc of the drip emitters of FIGS. 1-4.
Figure 14:
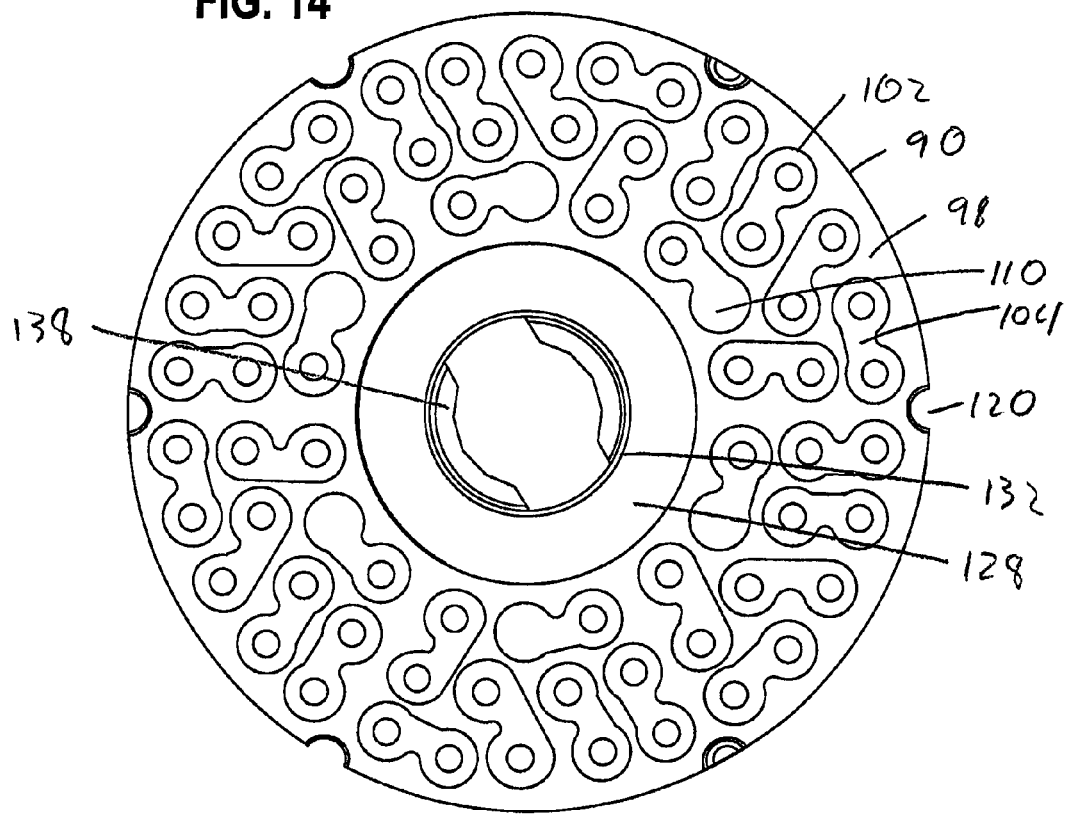
FIG. 14 is a top view of the flow disc of FIG. 13.
Figure 15:
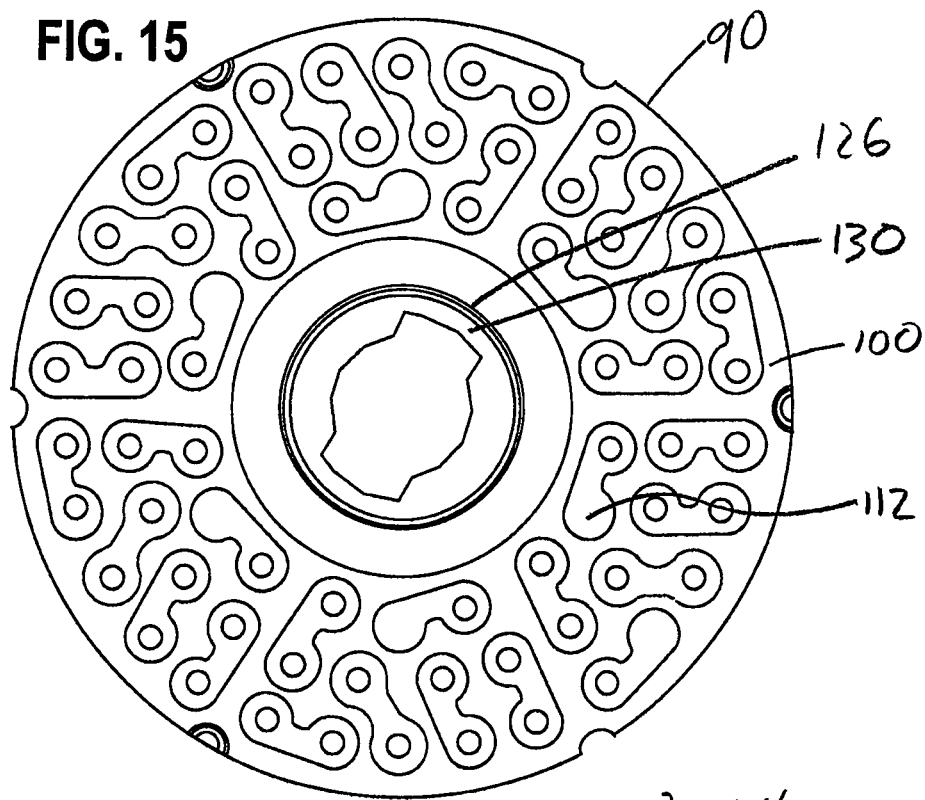
FIG. 15 is a bottom view of the flow disc of FIG. 13.
Figure 16:
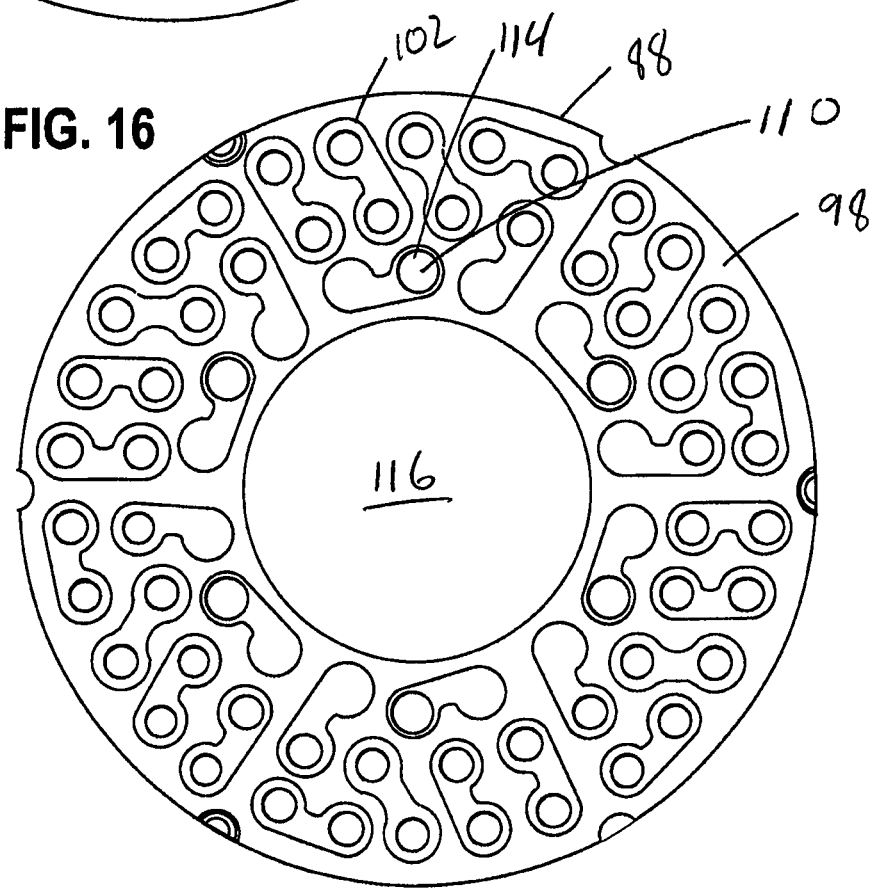
FIG. 16 is a top view of another flow disc of the drip emitter of FIGS. 1-4.

As shown in FIGS. 13-15, the poppet well flow disc 90 includes an integrally formed generally cylindrical support well 126. The support well 126 has a generally tapered annular surface 128 that intersects the poppet well flow disc 90 at the inlet side 98, tapering toward the outlet side 100 as the surface 128 extends toward the central axis of the poppet well flow disc 90. A generally cylindrical well wall 130 extends longitudinally from an inner edge 132 of the tapered annular surface 128. The well wall 130 has an open inlet end 134 and an open outlet end 136. Two arcuate support ribs 138 extend radially inward from the well wall 130 at the outlet end 136. The poppet well flow disc 90 does not include the center hole 116 of the standard flow disc 86 and the bypass flow disc 88. However, the poppet well flow disc 90 includes the eye-goggle shaped recesses 102 and the transfer holes 108 similar to the standard flow disc 86. In the case of the poppet well flow disc 90, in one embodiment, the transfer holes have a diameter of approximately 0.068+/−0.003 inches. In an alternative poppet well flow disc 90', the transfer holes 108 can have a diameter of approximately 0.055+/−0.003 inches. However, other diameters can also be used for the poppet well flow disc 90 or the alternative poppet well flow disc 90'. While the diameters of the transfer holes 108 of the poppet well flow disc 90 and alternative poppet well flow disc 90' are different, the remaining features are substantially the same. For that reason, unless otherwise noted, the description of the function of the emitter 10 referencing the poppet well flow disc 90 and related features applies to the similar features of the alternative poppet well flow disc 90' when the alternative poppet well flow disc 90' is used.

As shown in FIGS. 17-20, The flow regulator assembly 16 is comprised of a poppet 140, a spring 142, a check valve 144, and a diaphragm disc 146. The poppet 140 includes multiple sections: a core 148; a spring holder 150; diaphragm holder 152; a check valve holder 154; and a regulator end 156. The poppet 140 is integrally formed and made of a hard plastic material such as ABS; however, other materials could be used. The core 148 includes a diaphragm stopper disc 158 and a spring stopper disc 160 connected by a cross-shaped connector 162.

The spring holder 150 extends from the spring stopper disc 160 and has a cross shaped cross-section. The spring holder 150 is comprised of a retaining portion 164 and a guide portion 166. The retaining portion 164 is located adjacent the spring stopper disc 160 and has a cross-section greater than that of the guide portion. The guide portion 166 includes a rounded terminal end 168. In a preferred form, the retaining portion 164 is approximately 0.205+/−0.005 inches wide.

The diaphragm holder 152 extends axially from the diaphragm stopper disc 160 and is generally cylindrical. In a preferred form, the diameter of the diaphragm holder is approximately 0.170+/−0.005 inches; however, other diameters could be used. The check valve holder 154 extends axially from the diaphragm holder 152 and has an axially variable circular cross-section. Specifically, the check valve holder 154 has a tapering portion 170 adjacent the diaphragm holder 152 where the diameter of the tapering portion 170 is larger than the diameter of the diaphragm holder 152, and the diameter of the tapering portion 170 decreases as it extends axially away from the diaphragm holder 152. The tapering portion 170 leads to a generally cylindrical portion 172 having a radially protruding annular bead 174. In a preferred form, the diameter of the generally cylindrical portion is substantially the same as the diameter of the diaphragm holder 152 and the annual bead 174 has a radius of approximately 0.030+/−0.005 inches; however, other dimensions could be used.

The regulator end 156 extends axially from the check valve holder 154. The regulator end 156 includes a first cylindrical portion 176 having a diameter less than the diameter of the check valve holder 154. The first cylindrical portion 176 is connected to a tapered portion 178. The diameter of the tapered portion 178 increases as it extends axially away from the first cylindrical portion 176. The tapered portion 178 leads to a second cylindrical portion 180. The diameter of the second cylindrical portion is, preferably, approximately 0.187+0.000/−0.001 inches and the thickness is about 0.030+/−0.005 inches; however, other dimensions could also be used.

The spring 142 is a compression spring that preferably has closed ends. When assembled, the spring 142 receives the spring holder 150 of the poppet 140. The retaining portion 164 is wider than the diameter of the spring 142 such that it retains the spring 142 by putting it in radial tension. The spring is preferably made from UNS # s30200 (Stainless Steel); however, other materials could be used. In a preferred form, the overall length of the spring is approximately 0.92+/−0.015 inches having a spring rate of approximately 2.04 pounds/inch, a spring index of approximately 10.5, and a spring weight of approximately 0.80 pounds/thousand. However, other dimensions and specifications could be used.

As shown in FIG. 17, the diaphragm disc 146 is similar to the gasket discs 82 described above. The diaphragm disc 146 has a central retention hole 182 having a diameter that is slightly smaller than the diameter of the diaphragm holder 152. In a preferred embodiment, the diameter of the retention hole is approximately 0.160+/−0.005 inches; however, other diameters could be used. The diaphragm disc 146 is made of a flexible and resilient material, for example peroxide cured EPDM, 50 Shore A Durometer is a preferred form, so that it can be installed past the check valve holder 154 and about the diaphragm holder 152. As shown in FIG. 20, the diaphragm disc 146 is retained between the tapering portion 170 of the check valve holder 154 and the diaphragm stopper disc 158. Like the gasket discs 82, the diaphragm disc 146 includes the gasket flow holes 94 and the alignment notches 96 as described above. In a preferred form, the diameter of the flow holes 94 in the diaphragm disc are the same as those of the gasket disc 82; however, other diameters also could be used.

As shown in FIG. 19, the check valve 144 is made of a flexible and resilient material, such as Ethylene Propylene, 70 Durometer, and is installed about the check valve holder 154 of the poppet 140. The check valve 144 has a generally cylindrical shape having a sealing end 184 and a diaphragm end 186. The check valve 144 includes a check valve hole 188 along the central axis of the check valve 144 having an annular recess 190 and a tapered region 192. The annular recess 190 and the tapered region 192 are configured to receive, respectively, the annular bead 174 and the tapering portion 170 of the check valve holder 154 of the poppet 140. The check valve 144 also includes an axially extending annular sealing bead 194 disposed around the periphery of the sealing end 184. In a preferred form, the diameter of the check valve hole 188 is approximate 0.187 inches and the check valve 144 is approximately 0.250+/−0.005 thick along the axis and approximately 0.400+/−0.005 inches in diameter. However, other dimensions of the check valve 144 could also be used.

Figure 22:
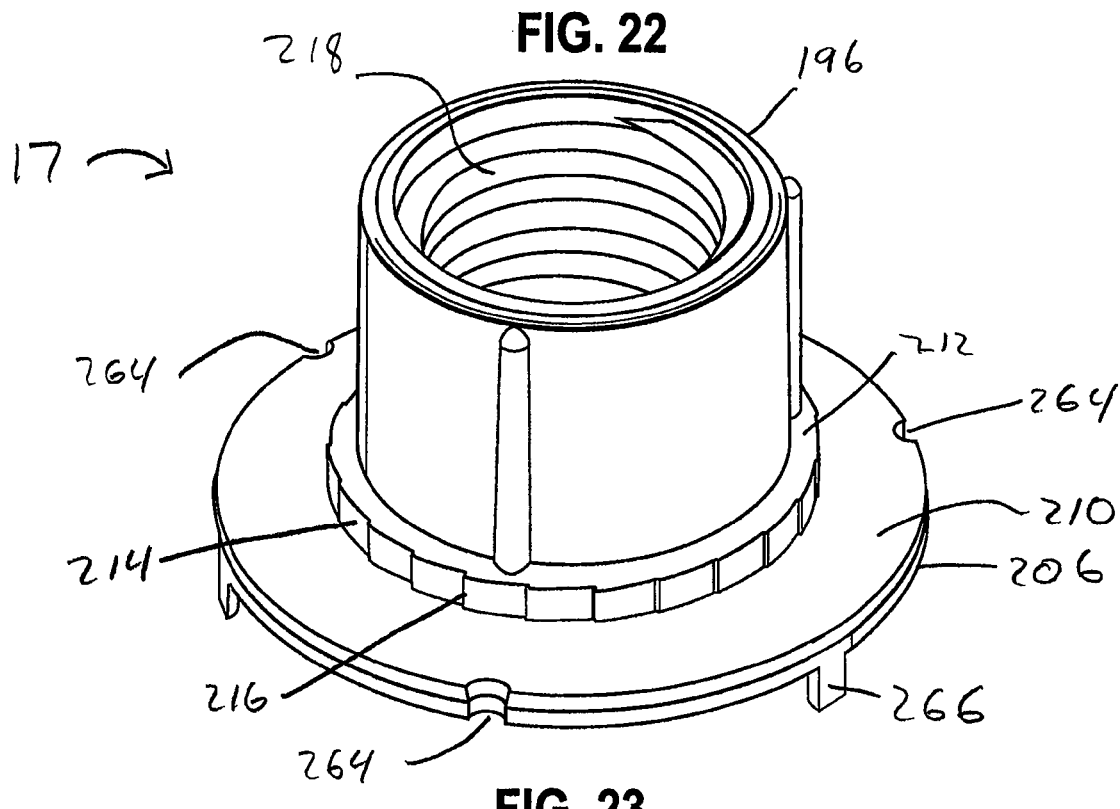
FIG. 22 is a perspective view of a pipe inlet of the drip emitters of FIGS. 1, 2, and 4.
Figure 23:
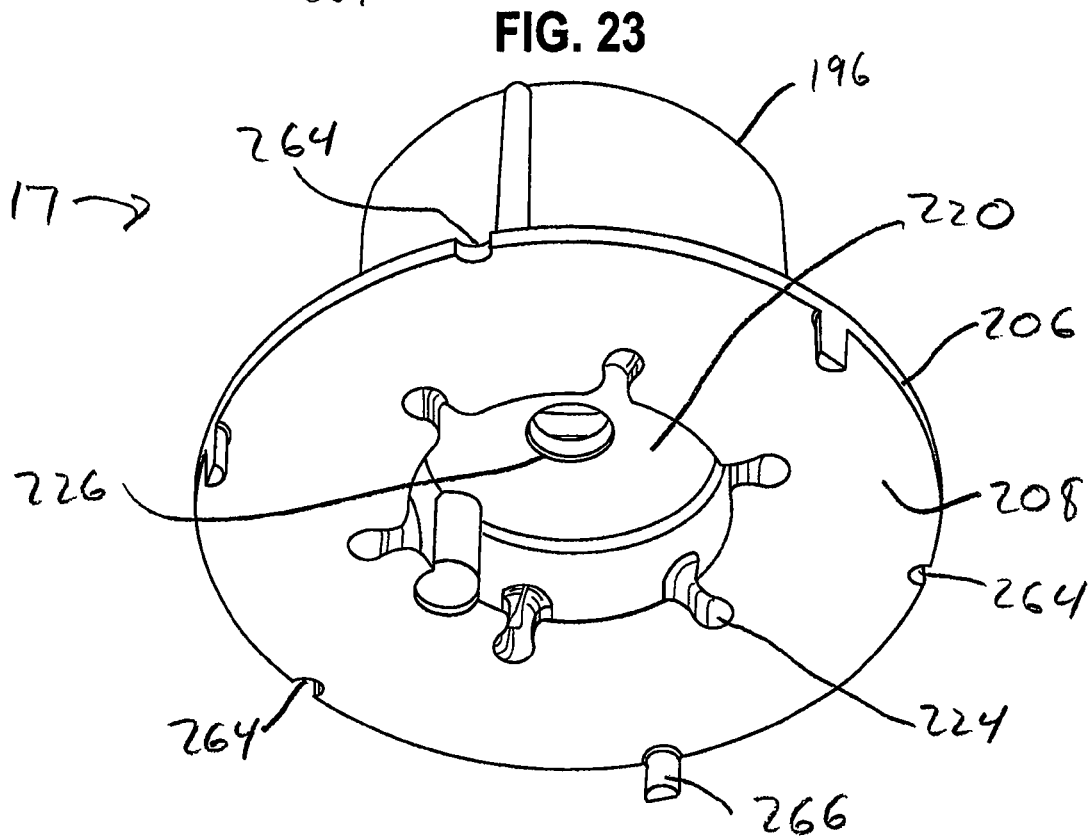
FIG. 23 is a perspective view of the pipe inlet of FIG. 22.

The inlet component or assembly 17 is capable of taking various forms based on the type of connection point or type. If a pipe connection is desired, the inlet component or assembly 17 is comprised of a pipe inlet 196 (FIGS. 22 and 23). As shown in FIG. 24, if a barb connection is desired, the inlet component or assembly 17 is comprised of a barb inlet 200, a barb seat 202, and an O-ring 204.

As shown in FIGS. 22 and 23, the pipe inlet 196 includes a generally circular base 206 having a sealing side 208 and a tapered side 210. The sealing side 208 is generally planar and the tapered side 210 has a generally tapered shape. An annular connecting ring 212 extends from the base 206 on the tapered side 210 and is integrally formed with the base 206. The connecting ring 212 includes a plurality of circumferential steps 214 defined by a plurality of longitudinally running ridges 216. The pipe inlet 196 further includes a hollow post 218 that is internally threaded. The post 218 extends axially from the connecting ring 212. The post 218 includes a flow restriction plate 220 that combines with the base 206 to define a distribution recess 222 on the sealing side 208. The distribution recess 222 includes, preferably, six distribution grooves 224 having a key-hole shape; however, other quantities of distribution grooves 224 could be used depending on the number of outlets 36. The restriction plate 220 includes a centrally located circular regulator hole 226 having a diameter substantially the same as the diameter of the second cylindrical portion 180 of the regulator end 156 of the poppet 140. In a preferred form, the diameter of the regulator hole is approximately 0.187+0.001/−0.000 inches; however, other dimensions could be used that correspond to differing dimensions of the regulator end 156 of the poppet 140.

As shown in FIG. 24, the barb inlet 200 and the barb seat 202 incorporate some of the features described above from the pipe inlet 196, as well as some unique features. The barb inlet 200 includes an annular base 228 having a plurality of the circumferential steps 214 and the ridges 216 previously described. The barb inlet 200 further includes a first annular step 230 and a second annular step 232 disposed axially from the annular base 228. The base 228, the first annular step 230, and the second step 232 are coaxial. A tapered cone portion 234 extends from the second annular step 232. An inlet tube 236 extends axially from the tapered cone portion 234 and has an open barb end 238. The inlet tube 236 defines a barb inlet channel 240. The barb inlet 200 includes a protective collar 242 disposed about the barb end 238. The protective collar 242 is connected to the second annular step 232 by a pair of arcuate support walls 244. The base 228, the first annular step 230, the second annular step 232, and the tapered cone portion 234 combine to define a barb seat recess 246, as shown in FIG. 3. The annular base 228 and the first annular step 230 also specifically define an annular O-ring recess 248, as shown in FIG. 3. Additionally, six connecting feet 250 extend from the annular base 228.

The barb seat 202 includes a barb seat base 252 having a sealing side 254 and a tapered side 256. An annular step 258 extends axially from the tapered side 256. A cylindrical wall 260 extends from the annular step 258 and is integral with the flow restriction plate 220 described above. The barb seat base 252, the annular step 258, the cylindrical wall 260, and the restriction plate 220 combined to define the distribution recess 222, as shown in FIG. 3. The distribution recess 222 includes, preferably, the six distribution grooves 224 having a key-hole shape similar to the pipe inlet 196 (FIG. 23). The restriction plate 220 includes the circular regulator hole 226 having a diameter substantially the same as the diameter of the second cylindrical portion 180 of the regulator end 156 of the poppet 140. The tapered side 256 of the barb seat further defines six foot recesses 262.

The O-ring 204 is made of a flexible and resilient material, such as Nitrile Buna N, 70 Durometer; however other materials could be used. In a preferred embodiment, the O-ring has an average internal diameter of approximately 0.739+/−0.010 inches, and a cross-section diameter of approximately 0.070+/−0.005 inches; however, other dimensions could be used. As shown in FIGS. 24 and 3, when assembled, the O-ring 204 is placed around the cylindrical wall 260 such that it abuts the annular step 258 of the barb seat 202. The barb inlet 200 then receives the barb seat 202 such that the O-ring 204 abuts the O-ring recess 248 of the barb inlet 200, as shown in FIG. 3.

While the different embodiments of the inlet component or assembly 17 have different shapes and components, they are both installed in the same manner and they both interface similarly with the rest of the emitter 10. For that purpose, unless otherwise noted, the description of the assembly and function of the emitter 10 referencing the pipe inlet 196 and related features applies to the similar features of the barb inlet 200 and the barb seat 202. For instance, when, among other similar features, the circular base 206, the sealing side 208 or tapered side 210 of the pipe inlet 196 are referenced, the description also applies, respectively, to the barb seat base 252, the sealing side 254, and the tapered side 256 of the barb seat 202. For additional clarity, both the features of the pipe inlet 196 and the barb inlet 200 and the barb seat 202 may be referenced at the same time.

The pipe inlet 196 and the barb seat 202 also include, preferably, three equally spaced alignment notches 264 defined by the base 206 and located at the periphery of the base 206. The pipe inlet 196 and the barb seat 202 also include, preferably, three pegs 266 extending from the sealing side 208 that are received in the alignment notches 96 of the diaphragm disc 146 and the installation notches 122 of the poppet well flow disc 90. However, other quantities could also be used.

As shown in FIG. 21, the locking cover 18 includes a top 267 and a generally cylindrical internally threaded sidewall 268. The top 267 has an external side 270 and an internal side 272. The internal side 272 includes a pair of concentric support rings 274 coaxial with the central axis of the threaded sidewall 268, as shown in FIGS. 2 and 3. The concentric support rings 274 each have an angled surface 276. The angled surfaces 276 are configured to coincide with the tapered side 210 of the circular base 206 or the tapered side 254 of the barb seat base 252. The top 267 also defines an opening 278 having, preferably, three flexible protrusions 280 configured to engage the ridges 216 of the circumferential steps 214 of either the barb inlet 200 or the pipe inlet 196 when assembled. Thus, the protrusions 280 flex to cam over the steps 214 in one direction and lock with the ridges 216 in the other to prevent unintentional removal of the top 267. However, other quantities could also be used. In a preferred form, the locking cover 18 is made from a generally hard plastic material such as Acetal; however, other materials could be used.

As shown in FIGS. 1-4, the emitter 10 is generally assembled according to the following process, though deviations from the process can still result in a successfully assembled emitter 10.

The housing 20 is initially produced for assembly. The six valves 22 are inserted into the six valve seats 44 of the housing 20 such that they are sub flush of the base surface 26. After the valves 22 are installed, the flow disc assembly 14 is inserted within the housing 20. The composition of the flow disc assembly 14, as described above, can vary depending on the desired flow output.

In one embodiment, the flow disc assembly 14 comprises four of the gasket discs 82, three of the bypass flow discs 88, and the poppet well flow disc 90. The flow disc assembly 14 is inserted into the housing 20 in the following order. The first of the four gasket discs 82 is inserted into the housing 20 adjacent the base surface 26. The gasket disc 82 is oriented such that the three alignment ribs 34 of the housing 20 are received within three of the alignment notches 96 of the gasket disc 82. The first of the three bypass flow discs 88 is inserted into the housing 20 adjacent the first of the four gasket discs 82. The first of the three bypass flow discs 88 is installed such that the installation pegs 124 are received within the alignment notches 96 of the gasket disc 82 and the alignment notches 35 of the manifold 24. The second of the four gasket discs 82 is inserted into the housing 20 adjacent the first of the three bypass flow discs 88 in the same manner as the previous gasket disc 82. The second of the three bypass flow discs 88 is inserted into the housing 20 adjacent the second gasket disc 82 in the same manner as the first bypass flow disc 88 except that the installation pegs 124 are received within the alignment notch 96 of the adjacent gasket disc 82 and the installation notch 122 of the previously installed bypass flow disc 88. The third of the four gasket discs 82 is inserted into the housing 20 adjacent the second bypass flow disc 88 in the same manner as the previous gasket disc 82. The third of the three bypass flow discs 88 is inserted into the housing 20 adjacent the third gasket disc 82 in the same manner as the previous bypass flow disc 88. The fourth of the four gasket discs 82 is inserted into the housing 20 adjacent the third bypass flow disc 88 in the same manner as the previous gasket disc 82. Finally, the poppet well flow disc 90 is inserted into the housing 20 adjacent the fourth gasket disc 82 in the same manner as the previous bypass flow disc 88.

In an alternate embodiment, the flow disc assembly 14 comprises four of the gasket discs 82, one of the bypass flow discs 88, two of the standard flow discs 86, and the alternative poppet well flow disc 90'. The flow disc assembly 14 is inserted into the housing 20 in the same manner as the previously described embodiment, except that the order of installation of the flow discs 84 is different. The first flow disc 84 installed is the bypass flow disc 88. The second and third flow discs 84 installed are the standard flow discs 86. The final flow disc 84 installed is the alternative poppet well flow disc 90'.

Regardless of which embodiment and composition of flow discs 84 are used, the remaining assembly steps apply equally. While the above described embodiments refer to specific compositions of the various flow discs 84, other quantities of the bypass flow discs 88 and the standard flow discs 86 can be installed within the spirit of the disclosure. Additionally, the various flow discs 84 can be installed in various sequences within the spirit of the invention. For example, as shown in FIGS. 2 and 3, three standard flow discs 86 can be used. Additionally, the flow disc assembly could comprise differing quantities of flow discs 84 and gasket discs 82. Further, either the poppet well flow disc 90 or the alternative poppet well flow disc 90' could be combined with the various compositions of the bypass flow discs 88 and the standard flow discs 86.

As shown in FIG. 20, the flow regulator assembly 16 is assembled such that the spring holder 150 of the poppet 140 is inserted into the spring 142 such that it retains the spring 142. The diaphragm disc 146 is inserted over and past the check valve holder 154 and about the diaphragm holder 152 such that the diaphragm disc 146 is retained between the diaphragm stopper disc 158 and the tapering portion 170 of the check valve holder 154. The check valve 144 is inserted over and about the check valve holder 154 such that the annular bead 174 is received within the annular recess 190. The flow regulator assembly 16 is inserted into the outlet assembly 12 and the flow disc assembly 14 such that the spring 142 is adjacent the annular step 76 of the tower 70 and the tower recess 74 receives the rounded terminal end 168 of the spring holder 150. The diaphragm disc 146 is adjacent the inlet side 98 of the poppet well flow disc 90 and aligned such that the alignment ribs 34 of the housing 20 are received within the alignment notches 96 of the diaphragm disc 146.

The inlet component or assembly 17 is installed next. If the pipe inlet 196 is installed, it is inserted within the housing 20 such that the sealing side 208 is adjacent the diaphragm disc 146. The installation pegs 266 are received within the alignment notches 96 of the diaphragm disc 146 and the installation notches 122 of the poppet well flow disc 90. The alignment notches 264 receive the alignment ribs 34. The sealing bead 194 of the check valve 144 contacts the restriction plate 220, and the regulator end 156 of the poppet 140 passes through the regulator hole 226 in the restriction plate 220.

The barb inlet 200 and the barb seat 202 are installed similarly. The barb seat 202 is installed in the same manner as the pipe inlet 196. The O-ring 204 is installed around the cylindrical wall 260 such that it abuts the annular step 258. The barb inlet 200 is installed onto the barb seat 202 such that the feet 250 are received within the foot recesses 262 of the barb seat 202, and the annular recess 190 is adjacent the O-ring 204, as shown in FIG. 3.

As shown in FIGS. 2 and 3, the locking cover 18 is placed over the inlet component or assembly 17 about the outer wall 28 of the housing 20. The threaded sidewall 268 of the locking cover 18 engages the threaded region 32 of the housing 20. When the locking cover 18 has been rotated a sufficient distance, the angled surfaces 276 of the concentric rings 274 contact the tapered side 210 of the pipe inlet 196 or the feet 250 of the barb inlet 200 and the tapered side 256 of the barb seat 202. The continued rotation will put the installed components into compression, particularly the gasket discs 82, the diaphragm disc 146, the spring 142, the check valve 144, and, if the embodiment includes it, the O-ring 204. When the locking cover 18 is installed, the flexible protrusions 280 cam over the steps 214 in the installation direction and engage the ridges 216 of the circumferential steps 214 in the opposite direction, which prevents the locking cover 18 from becoming unscrewed after installation. In the event that the locking cover 18 requires removal, the flexible protrusions 280 can be manually pulled away from the ridges 216.

The assembled emitter 10 is attached to the water supply conduit via threaded engagement with the pipe inlet 196 or by attaching a supply tube to the barb inlet 200, depending on the embodiment. When the water pressure in the water supply conduit flows through the conduit, it enters the emitter 10 through the inlet component or assembly 17. When water pressure in the conduit is below a predetermined threshold level, preferably approximately 10 psi, the check valve 144 remains pressed against the restriction plate 220 due to the bias of the spring 142 and water does not flow beyond the check valve 144, as shown by the operational condition illustrated in FIG. 2. When the water pressure exceeds the threshold level it overcomes the bias of the spring 142 and the check valve 144 is forced away from the flow restriction plate 220. The poppet 140 will translate axially and the diaphragm 146 will deflect and contact the tapered annular surface 128 as shown by the operational condition illustrated in FIG. 3. The resiliency of the diaphragm 146 will create a bias on the poppet 140 toward the inlet component or assembly 17. However, the combined bias in the flexed diaphragm 146 and the compressed spring 142 is generally insufficient to overcome the pressure of the water flowing into the emitter 10 from the water supply conduit once the check valve 144 has opened. In a preferred form, the poppet 140 translates approximately 0.060 inches axially when water has exceeded the threshold level.

As the water pressure increases further beyond the threshold level, the poppet 140 will translate further into the tower recess 74, the regulator end 156 will translate within the regulator hole 226, and the diaphragm 146 will deflect within the well wall 130. In a preferred form, the poppet 140 may translate approximately 0.030 inches beyond the preferred initial translation of approximately 0.060 inches.

As the diaphragm 146 deflects within the well wall 130, the resiliency of the diaphragm 146 will increase the bias on the poppet 140 toward the inlet component or assembly 17. Thus, as the water pressure increases, the poppet 140 translates further toward the manifold 24 and the bias toward the inlet component or assembly 17 increases. Because of the shape of the regulator end 156, the further the poppet 140 translates toward the manifold 24, the less area there is for water to flow through the regulator hole 226. This reduced area causes a pressure drop. The smaller the area the lesser the pressure of the water flowing past the check valve 144. As the water pressure in the supply conduit decreases, the bias in the diaphragm 146 and spring 142 pushes the poppet 140 toward the inlet component or assembly 17, the area becomes larger, and the pressure decreases less. The ability to decrease the area when water pressure is high and alternatively increase the area when water pressure is low allows the emitter 10 to maintain a relatively constant flow rate regardless of the fluctuations of water pressure in the water supply conduit. In a preferred form, the emitter 10 can maintain a relatively constant flow output as the water pressure in the water supply conduit fluctuates between 10 psi and 75 psi; however, a relative constant flow output could be obtained within other ranges of pressure in the water supply conduit.

As shown by the operational condition illustrated in FIG. 3, as the water pressure increases beyond the threshold level, the diaphragm disc 146 flexes toward the tapered annular surface 128 of the poppet well flow disc 90. The diaphragm disc 146 and the poppet 140 can translate further within the well wall 130 but the poppet 140 is limited in the distance it can translate toward the manifold 24 because of the spring stopper disc 160 and the arcuate support ribs 138 of the poppet well flow disc 90. The resiliency of the diaphragm disc 146 and the compression of the spring 142 function to bias the poppet 140 toward the inlet component or assembly 17 so that when the water pressure falls below the threshold level, the combined bias of the spring 142 and diaphragm 146 will overcome the incoming water pressure and cause the check valve 144 to seal against the restriction plate 220 and prevent water from flowing through the emitter 10, as shown by the operational condition illustrated in FIG. 2. The check valve 144 will remain sealed until the water pressure in the water supply conduit exceeds the threshold level again.

While the function of the emitter 10 has been described with respect to a predetermined threshold level in a preferred form (approximately 10 psi), other predetermined threshold levels could be achieved.

Water that has entered the distribution recess 222 will flow into the distribution grooves 224 and through the flow holes 94 of the diaphragm disc 146. Each distribution groove 224 is in fluid communication with one of the regions 106 of the flow discs 84 and with the flow holes 94 of the diaphragm disc 146. The water flow through each region 106 is substantially the same. Water that has traveled through the flow holes 94 will travel toward the entry points 110 of the poppet well flow disc 90. The water will then travel through the tortuous portion 118 of the flow path 19 created between the eye-goggle shaped recesses 102 and the adjacent diaphragm disc 146 and the gasket disc 82, as described above. Water will exit the tortuous portion 118 at the exit point 112 of the poppet well flow disc 90 and will then travel through the flow hole 94 of the adjacent gasket disc 82. The water will then travel toward the entry point 110 of the subsequent flow disc 84. If the flow disc is one of the standard flow discs 86, then water will travel through the tortuous portion 118 created by the standard flow disc 86 and the adjacent gasket discs 82 until it reaches the exit point 112 of the standard flow disc 86, at which point the water will pass through the flow hole 94 of the adjacent gasket disc 82. If the flow disc 84 is one of the bypass flow discs 88, the water will flow through the bypass hole 114 created in the intermediate layer 104 and through the exit point 112 of the bypass flow disc 88, at which point the water will pass through the flow hole 94 of the adjacent gasket disc 82. This process is repeated through the subsequent flow discs 84 and gasket discs 82 comprising the particular embodiment.

When water has passed through the flow hole 94 of the gasket disc 84 adjacent the base surface 26, it will enter the outlet bath 42. The water will accumulate in the outlet bath 42 and within the recesses 62 of the valve 22. If one of the recesses 62 is open to the outlet channel 40, as shown in FIG. 2, the water will flow through the outlet channel 40 and out of the emitter 10 through the outlet 36. If the valve 22 is turned to the "off" position such that the recess 62 is not open to the outlet channel 40, then the water will not exit the emitter 10 through the closed off outlet 36. However, water will continue to exit the emitter 10 through the outlets 36 corresponding to the valves 22 in the open position.

As water flows through the flow path 19 and the tortuous portion 118 it experiences a pressure drop so that water exits the emitter 10 through the outlets 36 at pressure lower than the pressure in the supply line. The water also experiences a pressure drop as it flows through the flow holes 94 of the gasket disc 82 and the bypass holes 114 of the bypass flow discs 88 (if used). Additionally, the emitter 10 is capable of distributing water to multiple locations when there are multiple outlets 36 used. In the above described embodiments, the emitter 10 includes six outlets; however, other quantities of outlets 36 could also be used. The emitter 10 can be adjusted to emit water at fewer locations than the number of outlets 36 that exist by using the "on" and "off" positions of the valves 22. The end user can decide whether to use all six of the outlets 36 by leaving all six of the valves 22 in the "on" position or whether to use fewer than the maximum, such as by turning two of the valves 22 to the "off" position thus resulting in water exiting the emitter 10 through four of the outlets 36 to four distinct locations. Accordingly, when six outlets 36 exist, the user can choose between zero and six locations to irrigate. Each outlet 36 can be connected to an external outlet line, tube, or other conduit (not shown) for delivering irrigation to various areas located a distance away from the emitter 10.

The emitter 10 also restricts the amount and size of grit or debris that enters the emitter 10. Because the area between the regulator end 156 of the poppet 140 and the regulator hole 226 of the inlet component or assembly 17, grit that is larger than the opening will not pass enter the emitter 10 past the restriction plate 220. Grit that is smaller than the area between the regulator end 156 and the regulator hole 226 will flow into the emitter and travel along the flow path 19 along with the water and exit the emitter 10 through the outlets 36 because the size of the flow path 19 is greater than the size of grit that is capable of entering the flow path. Any grit that is too large to pass through the regulator hole 226 that has accumulated around the regulator end 156 will tend to pass back into the water supply conduit which aids in eliminating clogging of the emitter 10.

It will be understood that various changes in the details, materials, and arrangements of parts and components which have been herein described and illustrated in order to explain the nature of the irrigation emitter may be made by those skilled in the art within the principle and scope of the irrigation emitter as expressed in the appended claims. Furthermore, while various features have been described with regard to a particular embodiment, it will be appreciated that features described for one embodiment may also be incorporated with the other described embodiments.

What is claimed is:

1. An irrigation apparatus comprising:
    a housing having at least one inlet, at least one outlet and a seat wall defining a port intermediate the at least one inlet and the at least one outlet, the seat wall having an upstream facing side and a downstream facing side, a regulator seat at the port on the upstream facing side and a valve seat at the port on the downstream facing side;
    an elongated path in the housing between the at least one inlet and the at least one outlet;
    a flow valve having a valve member having a first position engaging the valve seat for preventing flow from the at least one inlet to the elongated path when incoming flow pressure is below a predetermined level and a second position being spaced from the valve seat for permitting flow from the at least one inlet to the elongated path when the incoming flow pressure is above a predetermined level;
    a flow regulator upstream of the flow valve and the elongated path and capable of being spaced varying distances from the regulator seat to regulate the flow to the elongated path when the incoming flow pressure is above the predetermined level and being dependent on the incoming flow pressure;
    a common poppet for the flow regulator and the flow valve;
    a layer disposed in the housing downstream of the flow valve between the at least one inlet and the at least one outlet, the layer having a stop portion configured to restrict movement of the poppet and at least one flow passage that forms at least a part of the elongated path; and
    wherein the flow regulator and the elongated path cause a pressure drop between the at least one inlet and the at least one outlet.

2. The irrigation apparatus of claim 1 wherein the valve member is biased towards the first position.

3. The irrigation apparatus of claim 2 wherein the valve member is carried by the poppet.

4. The irrigation apparatus of claim 3 wherein the valve member includes an annular rib that engages the valve seat when in the first position.

5. The irrigation apparatus of claim 1 wherein the poppet extends through the port and the flow regulator includes an upstream terminal end of the poppet configured for regulating flow.

6. The irrigation apparatus of claim 5 further comprising a diaphragm connected to the poppet and wherein incoming flow pressure above a predetermined level acting on the diaphragm moves the valve member from the first position to the second position.

7. The irrigation apparatus of claim 6 wherein the housing includes a guide for reciprocational movement of the poppet.

8. The irrigation apparatus of claim 7 wherein a spring biases the valve member towards the first position and the diaphragm acts on the poppet.

9. The irrigation apparatus of claim 1 wherein the at least one inlet includes internal threading for attachment to a fluid supply line.

10. The irrigation apparatus of claim 1 wherein the at least one inlet includes a barb for attachment to a fluid supply line.

11. The irrigation apparatus of claim 10 wherein the at least one inlet includes a protective member generally disposed about the barb.

12. The irrigation apparatus of claim 1 wherein the at least one outlet includes an outlet valve having a first position preventing flow from the at least one outlet and a second position permitting flow from the at least one outlet.

13. The irrigation apparatus of claim 1 wherein the housing includes a plurality of outlets.

14. The irrigation apparatus of claim 13 wherein each outlet includes an outlet valve having a first position preventing flow from the outlet and a second position permitting flow from the outlet.

15. The irrigation apparatus of claim 1 wherein the elongated path includes a plurality of orifices disposed therealong for causing a pressure drop.

16. The irrigation apparatus of claim 1 wherein the elongated path is formed in part by a plurality of layers.

17. The irrigation apparatus of claim 16 wherein the plurality of layers includes at least one pattern layer having recesses on both sides and at least one gasket layer having a gasket orifice.

18. The irrigation apparatus of claim 17 wherein the plurality of layers defines a tortuous portion of the elongated path wherein the recesses of the at least one pattern layer are connected in series by at least one recess orifice so that the flow passes from one side of the at least one pattern layer to the other side of the at least one pattern layer.

19. The irrigation apparatus of claim 18 wherein the plurality of layers includes at least two pattern layers and at least one gasket layer interposed therebetween.

20. The irrigation apparatus of claim 18 wherein the plurality of layers includes at least one bypass layer having a bypass orifice and at least one gasket layer having a gasket orifice.

21. The irrigation apparatus of claim 20 wherein the bypass orifice is larger than the gasket orifice.

22. The irrigation apparatus of claim 18 wherein the elongated path is formed at least in part by the tortuous portion and formed at least in part by a non-tortuous portion.

23. The irrigation apparatus of claim 21 wherein the plurality of layers is stacked in the following order: (a) one of the at least one pattern layers; (b) one of the at least one gasket layers; (c) one of the at least one bypass layers; (d) one of the at least one gasket layers; (e) one of the at least one bypass layers; (f) one of the at least one gasket layers; (g) one of the at least one bypass layers; and (h) one of the at least one gasket layers wherein the at least one pattern layer (a) is upstream of the at least one gasket layer (h).

24. An irrigation apparatus comprising:
    a housing having at least one inlet and at least one outlet;
    an elongated path in the housing between the at least one inlet and the at least one outlet;
    a flow valve having a valve member having a first position preventing flow from the at least one inlet to the elongated path when incoming flow pressure is below a predetermined level and a second position permitting flow from the at least one inlet to the elongated path when the incoming flow pressure is above a predetermined level;
    a flow regulator upstream of the flow valve and the elongated path to regulate the flow to the elongated path when the incoming flow pressure is above the predetermined level and being dependent on the incoming flow pressure;
    wherein the flow regulator and the elongated path cause a pressure drop between the at least one inlet and the at least one outlet;
    wherein the elongated path is formed in part by a plurality of layers;
    wherein the plurality of layers includes at least one pattern layer having recesses on both sides and at least one gasket layer having a gasket orifice;

wherein the plurality of layers defines a tortuous portion of the elongated path wherein the recesses of the at least one pattern layer are connected in series by at least one recess orifice so that the flow passes from one side of the at least one pattern layer to the other side of the at least one pattern layer;

wherein the plurality of layers includes at least one bypass layer having a bypass orifice and at least one gasket layer having a gasket orifice;

wherein the bypass orifice is larger than the gasket orifice; and wherein the plurality of layers is stacked in the following order: (a) one of the at least one pattern layers; (b) one of the at least one gasket layers; (c) one of the at least one pattern layers; (d) one of the at least one gasket layers; (e) one of the at least one pattern layers; (f) one of the at least one gasket layers; (g) one of the at least one bypass layers; and (h) one of the at least one gasket layers wherein the at least one pattern layer (a) is upstream of the at least one gasket layer (h).

25. A method of manufacturing an irrigation apparatus comprising the steps of:

providing a housing having an open end;

inserting a pressure reducing flow member defining an elongated flow path into the housing through the open end;

providing a flow regulator;

providing a wall defining a port at the housing and a poppet for the flow regulator;

advancing a radially enlarged portion of a regulator end of the poppet through the port from a downstream side of the wall defining the port to an upstream side of the wall and positioning a tapered portion of the regulator end of the poppet within the port such that the flow regulator cooperates with the upstream side of the wall at the port; and attaching a cover with an inlet attachment at the open end of the housing.

26. The method of claim 25 further comprising inserting an outlet valve into at least one outlet of the housing.

27. The method of claim 25 further comprising inserting an outlet valve into each of a plurality of outlets of the housing.

28. The method of claim 25 wherein the step of inserting a pressure reducing flow member includes inserting a plurality of layers defining the elongated flow path.

29. The method of claim 28 wherein the step of inserting a pressure reducing flow member includes inserting in an alternating fashion at least one pattern layer having recesses on both sides and at least one gasket layer having at least one orifice.

30. The method of claim 29 wherein the step of inserting a pressure reducing flow member further includes the step of inserting at least one bypass layer having at least one bypass orifice.

31. The method of claim 30 wherein the step of inserting the plurality of layers includes inserting the plurality of layers stacked together in the following order: (i) one of the at least one pattern layers; (ii) one of the at least one gasket layers; (iii) one of the at least one bypass layers; (iv) one of the at least one gasket layers; (v) one of the at least one bypass layers; (vi) one of the at least one gasket layers; (vii) one of the at least one bypass layers; and (viii) one of the at least one gasket layers wherein the at least one pattern layer (i) is upstream of the at least one gasket layer (viii).

32. A method of manufacturing an irrigation apparatus comprising the steps of:

(a) providing a housing having an open end;

(b) inserting a pressure reducing flow member defining an elongated flow path into the housing through the open end further comprising the steps of:

inserting a plurality of layers defining the elongated flow path;

inserting in an alternating fashion at least one pattern layer having recesses on both sides and at least one gasket layer having at least one orifice;

inserting at least one bypass layer having at least one bypass orifice; and wherein the step of inserting the plurality of layers includes inserting the plurality of layers stacked together in the following order: (i) one of the at least one pattern layers; (ii) one of the at least one gasket layers; (iii) one of the at least one pattern layers; (iv) one of the at least one gasket layers; (v) one of the at least one pattern layers; (vi) one of the at least one gasket layers; (vii) one of the at least one bypass layers; and (viii) one of the at least one gasket layers wherein the at least one pattern layer (i) is upstream of the at least one gasket layer (viii);

(c) inserting a flow valve having a valve member;

(d) inserting a flow regulator upstream of the flow valve; and (e) attaching a cover with an inlet attachment at the open end of the housing.

33. The method of claim 25 wherein the steps are performed in the following order:

first, providing the housing having the open end;

second, inserting the pressure reducing flow member defining the elongated flow path into the housing through the open end;

third, providing the flow regulator;

fourth, providing the wall defining the port at the housing and the poppet for the flow regulator; and fifth, advancing the radially enlarged portion of the regulator end of the poppet through the port from the downstream side of the wall defining the port to the upstream side of the wall.

34. An irrigation apparatus comprising:

a housing having at least one inlet and at least one outlet;

an elongated path in the housing between the at least one inlet and the at least one outlet;

a flow regulator upstream of the elongated path to regulate flow to the elongated path and being dependent on incoming flow pressure;

a layer disposed in the housing between the at least one inlet and the at least one outlet, the layer having a flow passage that forms at least a part of the elongated path;

a poppet for the flow regulator that is movable relative to the layer with variation of the incoming flow pressure;

a flexible diaphragm being connected to the poppet to move the poppet based on the incoming flow pressure, the flexible diaphragm disposed between the at least one inlet and the elongated path, the flexible diaphragm having at least one flow hole that permits flow to the elongated path; and wherein the flow regulator and the elongated path cause a pressure drop between the at least one inlet and the at least one outlet.

35. The irrigation apparatus of claim 34 wherein the housing includes a guide for reciprocational movement of the poppet.

36. An irrigation apparatus comprising:

a housing having at least one inlet and a plurality of outlets, and each of the plurality of outlets including an outlet valve having a first position preventing flow therethrough and a second position permitting flow therethrough;

a plurality of elongated paths in the housing between the at least one inlet and the plurality of outlets with each of the plurality of elongated paths being associated with a different one of the plurality of outlets;

a flow regulator upstream of the elongated paths to regulate flow to the elongated paths and being dependent on incoming flow pressure;

a flexible diaphragm that is connected to the flow regulator and is configured to move the flow regulator based on the incoming flow pressure, the flexible diaphragm disposed between the at least one inlet and the elongated paths, the flexible diaphragm having a plurality of flow holes that permit flow to the elongated paths; and wherein the flow regulator and the elongated paths cause a pressure drop between the at least one inlet and the plurality of outlets.

37. An irrigation apparatus comprising:

a housing having at least one inlet and at least one outlet;

an elongated path in the housing between the at least one inlet and the at least one outlet, the elongated path being formed by a plurality of layers, the plurality of layers defining a void extending through at least one of the plurality of layers;

a flow regulator upstream of the elongated path to regulate flow to the elongated path and being dependent on incoming flow pressure;

a flexible diaphragm that is connected to the flow regulator and is configured to move the flow regulator based on the incoming flow pressure, the flexible diaphragm disposed between the at least one inlet and the elongated path, the flexible diaphragm having at least one flow hole that permits flow to the elongated path; and wherein at least a portion of the flow regulator extends into the void and is movable relative to the plurality of layers with variation of the incoming flow pressure, and the flow regulator and the elongated path cause a pressure drop between the at least one inlet and the at least one outlet.

38. The irrigation apparatus of claim 37 wherein the flow regulator includes a poppet that extends at least partially into the void.

39. The irrigation apparatus of claim 38 wherein the plurality of layers includes at least one pattern layer having recesses on both sides and at least one gasket layer having a gasket orifice, the recesses of the at least one pattern layer are connected in series by at least one recess orifice so that the flow passes from one side of the at least one pattern layer to the other side of the at least one pattern layer.

40. The irrigation apparatus of claim 1 further comprising a cover attached to the housing and having an inlet attachment component, a collar component and a one-way attachment between the inlet and collar components to enable attachment of the cover to the housing and resist unintentional detachment of the cover from the housing.

41. The method of claim 25 wherein the step of attaching a cover with an inlet attachment at the open end of the housing includes attaching the cover with an inlet component and a collar component and a one-way attachment between the inlet and collar components to enable attachment of the cover and resist unintentional detachment of the cover.

42. The method of claim 25 further comprising providing a flow valve having a valve member.

43. The method of claim 42 wherein providing the flow regulator includes providing the flow regulator upstream of the flow valve; and advancing the radially enlarged portion of the regulator end of the poppet through the port includes positioning the tapered portion of the regulator end of the poppet within the port such that the valve member cooperates with a downstream side of the wall at the port.

44. The irrigation apparatus of claim 34 further comprising a flow valve having a valve member having a first position preventing flow from the at least one inlet to the elongated path when the incoming flow pressure is below a predetermined level and a second position permitting flow from the at least one inlet to the elongated path when the incoming flow pressure is above a predetermined level.

45. The irrigation apparatus of claim 36 further comprising a flow valve having a valve member having a first position preventing flow from the at least one inlet to the elongated paths when the incoming flow pressure is below a predetermined level and a second position permitting flow from the at least one inlet to the elongated paths when the incoming flow pressure is above a predetermined level.

46. The irrigation apparatus of claim 37 further comprising a flow valve having a valve member having a first position preventing flow from the at least one inlet to the elongated path when the incoming flow pressure is below a predetermined level and a second position permitting flow from the at least one inlet to the elongated path when the incoming flow pressure is above a predetermined level.

* * * * *